(12) United States Patent
Chosack et al.

(10) Patent No.: US 7,850,456 B2
(45) Date of Patent: Dec. 14, 2010

(54) SURGICAL SIMULATION DEVICE, SYSTEM AND METHOD

(75) Inventors: Edna Chosack, Orange, OH (US); David Barkay, Kiryat Ono (IL); Ran Bronstein, Modiin (IL); Niv Fisher, Herzlia (IL)

(73) Assignee: Simbionix Ltd., Lod (IL)

( * ) Notice: Subject to any disclaimer, the term of this patent is extended or adjusted under 35 U.S.C. 154(b) by 755 days.

(21) Appl. No.: 10/891,488

(22) Filed: Jul. 15, 2004

(65) Prior Publication Data
US 2005/0032028 A1 Feb. 10, 2005

Related U.S. Application Data

(60) Provisional application No. 60/486,905, filed on Jul. 15, 2003.

(51) Int. Cl.
*G09B 23/28* (2006.01)

(52) U.S. Cl. .................. 434/272; 434/267; 345/619

(58) Field of Classification Search .......... 434/262, 434/267, 268, 272; 703/6, 7, 11; 345/419, 345/420, 619
See application file for complete search history.

(56) References Cited

U.S. PATENT DOCUMENTS

| | | | |
|---|---|---|---|
| 1,959,490 A | 5/1934 | Mistelski | |
| 3,024,539 A | 3/1962 | Rider | |
| 3,263,824 A | 8/1966 | Jones et al. | |
| 3,406,601 A | 10/1968 | Clifford | |
| 3,490,059 A | 1/1970 | Paulsen et al. | |
| 3,517,446 A | 6/1970 | Corlyon et al. | |
| 3,520,071 A | 7/1970 | Abrahamson et al. | |
| 3,573,444 A | 4/1971 | Kawabata et al. | |
| 3,579,842 A | 5/1971 | Scher | |

(Continued)

FOREIGN PATENT DOCUMENTS

EP 0 147 516 3/1988

(Continued)

OTHER PUBLICATIONS

Yoshitaka, Adachi et al., Intermediate Interpretation for Stiff Virtual Objects, Proceedings of the Virtual Reality Annual International Symposium (VRAIS' 95), Technical Research Center, Suzuki Motor Corporation, Yokohama, Japan.

(Continued)

*Primary Examiner*—Peter R Egloff
(74) *Attorney, Agent, or Firm*—Pearl Cohen Zedek Latzer, LLP

(57) ABSTRACT

A device system and method for simulating laparoscopic procedures, particularly for the purposes of instruction and/or demonstration. The system comprises one or more virtual organs to be operated on. The organ comprises a plurality of elements, each element having neighboring elements; and a plurality of tensioned connections connecting neighboring elements over said organ, such that force applied at one of said elements propagates via respective neighboring elements provides a distributed reaction over said organ. In addition there is a physical manipulation device for manipulation by a user; and a tracking arrangement for tracking said physical manipulation device and translating motion of said physical manipulation device into application of forces onto said virtual organ. The system is capable of simulating organs moving, cutting, suturing, coagulations and other surgical and surgery-related operations.

41 Claims, 7 Drawing Sheets

U.S. PATENT DOCUMENTS

| | | |
|---|---|---|
| 3,704,529 A | 12/1972 | Cioppa |
| 3,722,108 A | 3/1973 | Chase |
| 3,739,276 A | 6/1973 | Dornberger |
| 3,775,865 A | 12/1973 | Rowan |
| 3,789,518 A | 2/1974 | Chase |
| 3,795,061 A | 3/1974 | Sarnoff et al. |
| 3,795,150 A | 3/1974 | Eckhardt |
| 3,814,145 A | 6/1974 | Gott et al. |
| 3,861,065 A | 1/1975 | Courtenay et al. |
| 3,875,488 A | 4/1975 | Crocker et al. |
| 3,919,691 A | 11/1975 | Noll |
| 3,945,593 A | 3/1976 | Schanzer |
| 3,991,490 A | 11/1976 | Markman |
| 4,024,473 A | 5/1977 | Edge et al. |
| 4,024,873 A | 5/1977 | Antoshkiw et al. |
| 4,033,331 A | 7/1977 | Guss et al. |
| 4,078,317 A | 3/1978 | Wheatley et al. |
| 4,089,494 A | 5/1978 | Anderson et al. |
| 4,115,755 A | 9/1978 | Cotton |
| 4,136,554 A | 1/1979 | Larson |
| 4,148,014 A | 4/1979 | Burson |
| 4,162,582 A | 7/1979 | McGraw et al. |
| 4,177,984 A | 12/1979 | Douglas et al. |
| 4,182,054 A | 1/1980 | Wise et al. |
| 4,183,249 A | 1/1980 | Anderson |
| 4,227,319 A | 10/1980 | Guy et al. |
| 4,236,685 A | 12/1980 | Kissel |
| 4,250,636 A | 2/1981 | Horwitz |
| 4,250,887 A | 2/1981 | Dardik et al. |
| 4,262,549 A | 4/1981 | Schwellenbach |
| 4,264,312 A | 4/1981 | Cianci |
| 4,276,702 A | 7/1981 | Horwitz |
| 4,307,539 A | 12/1981 | Klein |
| 4,333,070 A | 6/1982 | Barnes |
| 4,334,216 A | 6/1982 | Lacroix |
| 4,360,345 A | 11/1982 | Hon |
| 4,398,889 A | 8/1983 | Lam et al. |
| 4,427,388 A | 1/1984 | Hope |
| 4,436,188 A | 3/1984 | Jones |
| 4,459,113 A | 7/1984 | Boscaro Gatti et al. |
| 4,464,117 A | 8/1984 | Foerst |
| 4,478,407 A | 10/1984 | Manabe |
| 4,481,001 A | 11/1984 | Graham et al. |
| 4,504,233 A | 3/1985 | Galus et al. |
| 4,513,235 A | 4/1985 | Acklam et al. |
| 4,545,390 A | 10/1985 | Leary |
| 4,550,617 A | 11/1985 | Fraignier et al. |
| 4,551,101 A | 11/1985 | Neumann |
| 4,573,452 A | 3/1986 | Greenberg |
| 4,599,070 A | 7/1986 | Hladky et al. |
| 4,604,016 A | 8/1986 | Joyce |
| 4,605,373 A | 8/1986 | Rosen |
| 4,632,341 A | 12/1986 | Repperger et al. |
| 4,642,055 A | 2/1987 | Saliterman |
| 4,646,742 A | 3/1987 | Packard et al. |
| 4,654,648 A | 3/1987 | Herrington et al. |
| 4,655,673 A | 4/1987 | Hawkes |
| 4,659,313 A | 4/1987 | Kuster et al. |
| 4,667,182 A | 5/1987 | Murphy |
| 4,688,983 A | 8/1987 | Lindbom |
| 4,706,006 A | 11/1987 | Solomon |
| 4,708,650 A | 11/1987 | Holewinski et al. |
| 4,708,656 A | 11/1987 | de Vries et al. |
| 4,712,101 A | 12/1987 | Culver |
| 4,713,007 A | 12/1987 | Alban |
| 4,726,772 A | 2/1988 | Amplatz |
| 4,733,214 A | 3/1988 | Andresen |
| 4,742,815 A | 5/1988 | Ninan et al. |
| 4,748,984 A | 6/1988 | Patel |
| 4,751,662 A | 6/1988 | Crosbie |
| 4,757,302 A | 7/1988 | Hatakeyama et al. |
| 4,769,763 A | 9/1988 | Trieb et al. |
| 4,775,289 A | 10/1988 | Kazerooni |
| 4,782,327 A | 11/1988 | Kley et al. |
| 4,786,892 A | 11/1988 | Kubo et al. |
| 4,789,340 A | 12/1988 | Zikria |
| 4,794,384 A | 12/1988 | Jackson |
| 4,795,296 A | 1/1989 | Jau |
| 4,797,104 A | 1/1989 | Laerdal et al. |
| 4,803,413 A | 2/1989 | Kendig et al. |
| 4,820,162 A | 4/1989 | Ross |
| 4,823,634 A | 4/1989 | Culver |
| 4,825,875 A | 5/1989 | Ninan et al. |
| 4,839,838 A | 6/1989 | LaBiche et al. |
| 4,857,881 A | 8/1989 | Hayes |
| 4,860,215 A | 8/1989 | Seraji |
| 4,865,423 A | 9/1989 | Doi |
| 4,867,685 A | 9/1989 | Brush et al. |
| 4,868,549 A | 9/1989 | Affinito et al. |
| 4,870,964 A | 10/1989 | Bailey, Jr. et al. |
| 4,874,998 A | 10/1989 | Hollis, Jr. |
| H703 H | 11/1989 | Repperger et al. |
| 4,879,556 A | 11/1989 | Duimel |
| 4,881,324 A | 11/1989 | Khinchuk |
| 4,885,565 A | 12/1989 | Embach |
| 4,887,966 A | 12/1989 | Gellerman |
| 4,891,764 A | 1/1990 | McIntosh |
| 4,896,554 A | 1/1990 | Culver |
| 4,907,796 A | 3/1990 | Roel-Rodriguez |
| 4,907,970 A | 3/1990 | Meenen |
| 4,907,973 A | 3/1990 | Hon |
| 4,909,232 A | 3/1990 | Carella |
| 4,912,638 A | 3/1990 | Pratt |
| 4,930,770 A | 6/1990 | Baker |
| 4,934,694 A | 6/1990 | McIntosh |
| 4,940,234 A | 7/1990 | Ishida et al. |
| 4,949,119 A | 8/1990 | Moncrief et al. |
| 4,955,654 A | 9/1990 | Tsuchihashi et al. |
| 4,961,138 A | 10/1990 | Gorniak |
| 4,961,267 A | 10/1990 | Herzog |
| 4,964,097 A | 10/1990 | Wang et al. |
| 4,975,546 A | 12/1990 | Craig |
| 4,982,618 A | 1/1991 | Culver |
| 4,982,918 A | 1/1991 | Kaye |
| 4,998,916 A | 3/1991 | Hammerslag et al. |
| 5,004,391 A | 4/1991 | Burdea |
| 5,007,300 A | 4/1991 | Siva |
| 5,009,598 A | 4/1991 | Bennington |
| 5,018,922 A | 5/1991 | Yoshinada et al. |
| 5,019,761 A | 5/1991 | Kraft |
| 5,021,982 A | 6/1991 | Crosbie et al. |
| 5,022,384 A | 6/1991 | Freels et al. |
| 5,033,352 A | 7/1991 | Kellogg et al. |
| 5,044,956 A | 9/1991 | Behensky et al. |
| 5,048,508 A | 9/1991 | Storz |
| 5,057,078 A | 10/1991 | Foote et al. |
| 5,062,594 A | 11/1991 | Repperger |
| 5,072,361 A | 12/1991 | Davis et al. |
| 5,077,769 A | 12/1991 | Franciose |
| 5,078,152 A | 1/1992 | Bond et al. |
| 5,086,296 A | 2/1992 | Clark |
| 5,103,404 A | 4/1992 | McIntosh |
| 5,104,328 A | 4/1992 | Lounsbury |
| 5,112,228 A | 5/1992 | Zouras |
| 5,116,051 A | 5/1992 | Moncrief et al. |
| 5,116,180 A | 5/1992 | Fung et al. |
| 5,125,843 A | 6/1992 | Holloway |
| 5,126,948 A | 6/1992 | Mitchell et al. |
| 5,135,488 A | 8/1992 | Foote et al. |
| 5,139,261 A | 8/1992 | Openiano |
| 5,142,931 A | 9/1992 | Menahem |
| 5,143,505 A | 9/1992 | Burdea et al. |
| 5,146,566 A | 9/1992 | Hollis, Jr. et al. |
| 5,149,270 A | 9/1992 | McKeown |

| | | | | | |
|---|---|---|---|---|---|
| 5,153,716 A | 10/1992 | Smith | 5,385,549 A | 1/1995 | Lampropoulos et al. |
| 5,158,459 A | 10/1992 | Edelberg | 5,389,865 A | 2/1995 | Jacobus et al. |
| 5,167,159 A | 12/1992 | Lucking | 5,396,267 A | 3/1995 | Bouton |
| 5,171,299 A | 12/1992 | Heitzmann et al. | 5,397,308 A | 3/1995 | Ellis et al. |
| 5,177,473 A | 1/1993 | Drysdale | 5,397,323 A | 3/1995 | Taylor et al. |
| 5,180,351 A | 1/1993 | Ehrenfried | 5,399,091 A | 3/1995 | Mitsumoto |
| 5,181,181 A | 1/1993 | Glynn | 5,402,801 A | 4/1995 | Taylor |
| 5,184,306 A | 2/1993 | Erdman et al. | 5,403,191 A | 4/1995 | Tuason |
| 5,184,319 A | 2/1993 | Kramer | 5,412,189 A | 5/1995 | Cragun |
| 5,185,561 A | 2/1993 | Good et al. | 5,412,880 A | 5/1995 | Raab |
| 5,186,629 A | 2/1993 | Rohen | 5,414,337 A | 5/1995 | Schuler |
| 5,189,355 A | 2/1993 | Larkins et al. | 5,423,754 A | 6/1995 | Cornelius et al. |
| 5,191,320 A | 3/1993 | MacKay | 5,425,644 A | 6/1995 | Szinicz |
| 5,193,963 A | 3/1993 | McAffee et al. | 5,425,709 A | 6/1995 | Gambale |
| 5,196,017 A | 3/1993 | Silva et al. | 5,428,748 A | 6/1995 | Davidson et al. |
| 5,197,003 A | 3/1993 | Moncrief et al. | 5,429,140 A | 7/1995 | Burdea et al. |
| 5,203,563 A | 4/1993 | Loper, III | 5,430,665 A | 7/1995 | Jin et al. |
| 5,204,600 A | 4/1993 | Kahkoska | 5,436,640 A | 7/1995 | Reeves |
| 5,209,131 A | 5/1993 | Baxter | 5,445,166 A | 8/1995 | Taylor |
| 5,209,661 A | 5/1993 | Hildreth et al. | 5,451,924 A | 9/1995 | Massimino et al. |
| 5,212,473 A | 5/1993 | Louis | 5,459,382 A | 10/1995 | Jacobus et al. |
| 5,215,523 A | 6/1993 | Williams et al. | 5,461,711 A | 10/1995 | Wang et al. |
| 5,220,260 A | 6/1993 | Schuler | 5,467,441 A | 11/1995 | Stone et al. |
| 5,222,893 A | 6/1993 | Hardesty | 5,467,763 A | 11/1995 | McMahon et al. |
| 5,223,776 A | 6/1993 | Radke et al. | 5,470,232 A | 11/1995 | Kelso et al. |
| 5,228,356 A | 7/1993 | Chuang | 5,473,235 A | 12/1995 | Lance et al. |
| 5,240,417 A | 8/1993 | Smithson et al. | 5,482,051 A | 1/1996 | Reddy et al. |
| 5,243,266 A | 9/1993 | Kasagami et al. | 5,492,530 A | 2/1996 | Fischell et al. |
| 5,246,007 A | 9/1993 | Frisbie et al. | 5,506,605 A | 4/1996 | Paley |
| 5,247,432 A | 9/1993 | Ueda | 5,512,919 A | 4/1996 | Araki |
| 5,252,068 A | 10/1993 | Gryder | 5,515,078 A | 5/1996 | Greschler et al. |
| 5,252,070 A | 10/1993 | Jarrett | 5,524,637 A | 6/1996 | Erickson |
| 5,257,462 A | 11/1993 | Buttermann | 5,541,831 A | 7/1996 | Thomas |
| 5,259,626 A | 11/1993 | Ho | 5,542,672 A | 8/1996 | Meredith |
| 5,259,894 A | 11/1993 | Sampson | 5,542,676 A | 8/1996 | Howe, Jr. et al. |
| 5,264,768 A | 11/1993 | Gregory et al. | 5,547,382 A | 8/1996 | Yamasaki et al. |
| 5,265,034 A | 11/1993 | Breckenridge et al. | 5,548,694 A | 8/1996 | Frisken Gibson |
| 5,269,519 A | 12/1993 | Malone | 5,553,198 A | 9/1996 | Wang et al. |
| 5,275,174 A | 1/1994 | Cook | 5,559,412 A | 9/1996 | Schuler |
| 5,275,565 A | 1/1994 | Moncrief | 5,565,840 A | 10/1996 | Thorner et al. |
| 5,279,309 A | 1/1994 | Taylor | 5,575,761 A | 11/1996 | Hajianpour |
| 5,279,563 A | 1/1994 | Brucker et al. | 5,577,981 A | 11/1996 | Jarvik |
| 5,280,265 A | 1/1994 | Kramer et al. | 5,580,249 A | 12/1996 | Jacobsen et al. |
| 5,283,970 A | 2/1994 | Aigner | 5,584,701 A | 12/1996 | Lampotang et al. |
| 5,286,203 A | 2/1994 | Fuller et al. | 5,587,937 A | 12/1996 | Massie et al. |
| 5,295,694 A | 3/1994 | Levin | 5,591,924 A | 1/1997 | Hilton |
| 5,296,846 A | 3/1994 | Ledley | 5,592,401 A | 1/1997 | Kramer |
| 5,296,871 A | 3/1994 | Paley | 5,599,301 A | 2/1997 | Jacobs et al. |
| 5,305,203 A | 4/1994 | Raab | 5,600,348 A | 2/1997 | Bartholow et al. |
| 5,309,140 A | 5/1994 | Everett, Jr. et al. | 5,607,157 A | 3/1997 | Nagashima |
| 5,311,422 A | 5/1994 | Loftin et al. | 5,607,308 A | 3/1997 | Copperman et al. |
| 5,313,230 A | 5/1994 | Venolia et al. | 5,609,485 A | 3/1997 | Bergman et al. |
| 5,313,568 A | 5/1994 | Wallace et al. | 5,609,607 A | 3/1997 | Hechtenberg et al. |
| 5,314,339 A | 5/1994 | Aponte | 5,616,030 A | 4/1997 | Watson |
| 5,317,689 A | 5/1994 | Nack et al. | 5,623,582 A | 4/1997 | Rosenberg |
| 5,318,533 A | 6/1994 | Adams et al. | 5,625,551 A | 4/1997 | Mitarai et al. |
| 5,324,260 A | 6/1994 | O'Neill et al. | 5,625,576 A | 4/1997 | Massie et al. |
| 5,327,790 A | 7/1994 | Levin et al. | 5,629,594 A | 5/1997 | Jacobus et al. |
| 5,334,027 A | 8/1994 | Wherlock | 5,631,861 A | 5/1997 | Kramer |
| 5,335,557 A | 8/1994 | Yasutake | 5,631,973 A | 5/1997 | Green |
| 5,344,354 A | 9/1994 | Wiley | 5,643,087 A | 7/1997 | Marcus et al. |
| 5,353,242 A | 10/1994 | Crosbie et al. | 5,651,775 A | 7/1997 | Walker et al. |
| 5,354,162 A | 10/1994 | Burdea et al. | 5,657,429 A | 8/1997 | Wang et al. |
| 5,355,148 A | 10/1994 | Anderson | 5,661,253 A | 8/1997 | Aoki |
| 5,364,271 A | 11/1994 | Aknin et al. | 5,661,667 A | 8/1997 | Rueb et al. |
| 5,366,376 A | 11/1994 | Copperman et al. | 5,666,473 A | 9/1997 | Wallace |
| 5,368,484 A | 11/1994 | Copperman et al. | 5,669,818 A | 9/1997 | Thorner et al. |
| 5,368,487 A | 11/1994 | Medina | 5,676,157 A | 10/1997 | Kramer |
| 5,368,565 A | 11/1994 | DeLong | 5,680,590 A | 10/1997 | Parti |
| 5,370,535 A | 12/1994 | Prendergast | 5,684,722 A | 11/1997 | Thorner et al. |
| 5,379,663 A | 1/1995 | Hara | 5,691,898 A | 11/1997 | Rosenberg et al. |
| 5,382,885 A | 1/1995 | Salcudean et al. | 5,694,013 A | 12/1997 | Stewart et al. |
| 5,384,460 A | 1/1995 | Tseng | 5,695,500 A | 12/1997 | Taylor et al. |

| | | | |
|---|---|---|---|
| 5,701,140 A | 12/1997 | Rosenberg et al. | |
| 5,704,791 A * | 1/1998 | Gillio | 434/262 |
| 5,709,219 A | 1/1998 | Chen et al. | |
| 5,716,016 A | 2/1998 | Iwade et al. | |
| 5,720,619 A | 2/1998 | Fisslinger | |
| 5,724,264 A | 3/1998 | Rosenberg et al. | |
| 5,731,804 A | 3/1998 | Rosenberg | |
| 5,736,978 A | 4/1998 | Hasser et al. | |
| 5,739,811 A | 4/1998 | Rosenberg et al. | |
| 5,742,278 A | 4/1998 | Chen et al. | |
| 5,749,853 A | 5/1998 | O'Donnell et al. | |
| 5,755,577 A | 5/1998 | Gillio | |
| 5,766,016 A | 6/1998 | Sinclair et al. | |
| 5,769,640 A * | 6/1998 | Jacobus et al. | 434/262 |
| 5,771,181 A | 6/1998 | Moore et al. | |
| 5,776,050 A | 7/1998 | Chen et al. | |
| 5,776,126 A | 7/1998 | Wilk et al. | |
| 5,781,172 A | 7/1998 | Engel et al. | |
| 5,797,900 A | 8/1998 | Madhani et al. | |
| 5,800,179 A * | 9/1998 | Bailey | 434/262 |
| 5,805,140 A | 9/1998 | Rosenberg et al. | |
| 5,806,521 A | 9/1998 | Morimoto et al. | |
| 5,807,377 A | 9/1998 | Madhani et al. | |
| 5,808,665 A | 9/1998 | Green | |
| 5,810,007 A | 9/1998 | Holupka et al. | |
| 5,821,920 A | 10/1998 | Rosenberg et al. | |
| 5,831,408 A | 11/1998 | Jacobus et al. | |
| 5,844,392 A | 12/1998 | Peurach et al. | |
| 5,882,206 A * | 3/1999 | Gillio | 434/262 |
| 5,889,670 A | 3/1999 | Schuler et al. | |
| 5,889,672 A | 3/1999 | Schuler et al. | |
| 5,930,741 A | 7/1999 | Kramer | |
| 5,945,978 A | 8/1999 | Holmes | |
| 5,951,301 A * | 9/1999 | Younker | 434/272 |
| 5,956,040 A * | 9/1999 | Asano et al. | 345/419 |
| 5,956,484 A | 9/1999 | Rosenberg et al. | |
| 5,971,767 A * | 10/1999 | Kaufman et al. | 434/267 |
| 5,986,643 A | 11/1999 | Harvill et al. | |
| 5,999,185 A | 12/1999 | Kato et al. | |
| 6,004,134 A | 12/1999 | Marcus et al. | |
| 6,024,576 A | 2/2000 | Bevirt et al. | |
| 6,037,927 A | 3/2000 | Rosenberg | |
| 6,038,488 A | 3/2000 | Barnes et al. | |
| 6,042,555 A | 3/2000 | Kramer et al. | |
| 6,050,962 A | 4/2000 | Kramer et al. | |
| 6,059,506 A | 5/2000 | Kramer | |
| 6,062,865 A | 5/2000 | Bailey | |
| 6,084,587 A | 7/2000 | Tarr et al. | |
| 6,088,017 A | 7/2000 | Tremblay et al. | |
| 6,104,379 A | 8/2000 | Petrich et al. | |
| 6,106,301 A * | 8/2000 | Merril | 434/262 |
| 6,110,130 A | 8/2000 | Kramer | |
| 6,111,577 A | 8/2000 | Zilles et al. | |
| 6,120,465 A | 9/2000 | Guthrie et al. | |
| 6,148,280 A | 11/2000 | Kramer | |
| 6,151,404 A * | 11/2000 | Pieper | 382/128 |
| 6,160,489 A | 12/2000 | Perry et al. | |
| 6,162,190 A | 12/2000 | Kramer | |
| 6,195,592 B1 | 2/2001 | Schuler | |
| 6,219,032 B1 | 4/2001 | Rosenberg et al. | |
| 6,222,523 B1 | 4/2001 | Harvill et al. | |
| 6,239,784 B1 | 5/2001 | Holmes | |
| 6,275,213 B1 | 8/2001 | Tremblay et al. | |
| 6,323,837 B1 | 11/2001 | Rosenberg | |
| 6,377,011 B1 * | 4/2002 | Ben-Ur | 318/566 |
| 6,413,229 B1 | 7/2002 | Kramer et al. | |
| 6,428,490 B1 | 8/2002 | Kramer et al. | |
| 6,497,672 B2 | 12/2002 | Kramer | |
| RE38,242 E | 9/2003 | Engel et al. | |
| 6,714,901 B1 * | 3/2004 | Cotin et al. | 703/7 |
| 6,876,891 B1 | 4/2005 | Schuler et al. | |
| 6,885,361 B1 | 4/2005 | Harvill et al. | |
| 7,215,326 B2 | 5/2007 | Rosenberg | |
| 7,353,151 B2 * | 4/2008 | Furusu et al. | 703/11 |
| 2002/0072814 A1 | 6/2002 | Schuler et al. | |
| 2003/0220556 A1 * | 11/2003 | Porat et al. | 600/407 |

FOREIGN PATENT DOCUMENTS

| | | |
|---|---|---|
| EP | 0 265 011 | 4/1988 |
| EP | 0 393 683 | 10/1990 |
| EP | 0 456 103 | 11/1991 |
| EP | 0 489 469 | 6/1992 |
| EP | 0 316 763 | 8/1992 |
| EP | 0 567 215 | 10/1993 |
| EP | 0 571 827 | 12/1993 |
| EP | 0 624 861 | 11/1994 |
| EP | 0 626 634 | 11/1994 |
| EP | 0 623 066 | 7/1997 |
| EP | 0 632 709 | 3/2002 |
| FR | 2592514 A1 | 12/1985 |
| GB | 2 195 808 | 4/1988 |
| GB | 2 252 656 A | 8/1992 |
| GB | 2 288 686 | 10/1995 |
| JP | 03-98080 | 4/1991 |
| WO | WO91/06935 | 5/1991 |
| WO | WO 91/11775 | 8/1991 |
| WO | WO 93/04625 | 3/1993 |
| WO | WO 93/08517 | 4/1993 |
| WO | WO 93/14483 | 7/1993 |
| WO | WO 9318475 | 9/1993 |
| WO | WO 94/25948 | 11/1994 |
| WO | WO 95/02233 | 1/1995 |
| WO | WO95/10080 | 4/1995 |
| WO | WO 95/32459 | 11/1995 |
| WO | WO 96/16389 | 5/1996 |
| WO | WO96/28800 | 9/1996 |
| WO | WO 99/38141 | 6/1999 |

OTHER PUBLICATIONS

M.L. Agronin., The Design of a Nine-String Six-Degree-of-Freedom Force-Feedback Joystick for Telemanipulation. pp. 340-348, Jet Propulsion Laboratory—California, LA.

Peter K Allen et al., Acquisition and Interpretation of 3-D Sensor Data from Touch, Dept. of Computer Science, Columbia University, NY, CH2813-4/89/0000/0033/$01.00 1989 IEEE pp. 33-40.

Fumihito Arai et al., Intelligent Assistance in Operation of Active Catheter for Minimum Invasive Surgery. Nagoya University—Nagoya, Japan, Kinjo University—Nagoya, Japan, IEEE International Workshop on Robot and Human Communication 0-7803-2002-6/94 $4.00 1994 IEEE.

Daniel Bachofen et al., Enhancing the Visual Realism of Hysteroscopy Simulation, Book Series: Studies in Health Technology and Informatics—Book Medicine meets Virtual Reality 14: Accelerating Change in Health Care: Next Medical Toolkit, vol. 119/2005 pp. 31-36.

J. Baille et al., Use of Computer Graphics Simulation for Teaching of Flexible Sigmoidoscopy. Duke University Medical Center, North Carolina, USA. Endoscopy 3 vol. 23 May 1991 pp. 126-129.

David Baraff, An Introduction to Physically Based Modeling: Ridged Body Simulation II—Nonpenetration Constraints, Robotics Institute Carnegie Mellon Institute, pp. 32-68 1997.

Adelstein et al., ASMA Symposium 1992, Design and Implementation of a Force Reflecting Manipuladum for Manual Control Research. CA, USA.

J.H. Anderson et al., Da Vinci: A Vascular Catheterization and Interventional Radiology-Based Training and Patient Pretreatment Planning Simulator (Abstract), JVIR Supplement, Journal of Vascular and Interventional Radiology, vol. 7, No. 1, Part 2., Jan.-Feb. 1996, Washington, US.

J. Batter and F. Brooks, Jr., Grope-1: A Computer Display to the Sense of Feel, 1972, North Carolina, USA.

M. Bostrom et al., Design of An Interactive Lumbar Puncture Simulator With Tactile Feedback, IEEE Neutral Network Counsel Virtual Reality Annual International Symposium Conference Sep. 18-22, 1993; Seattle, Washington U.S.

M. Bostrom, Design of Hardware for Simulating Lumbar Puncture with Force Feedback, Thayer School of Engineering, Dartmouth College. Mar. 17, 1993.

F. P. Brooks, et al., Project Grope—Haptic Displays for Scientific Visualization, ACM, Computer Graphics, vol. 24, No. 4., Aug. 1990 - Chapel Hill NC, USA.

G. Burdea and T. Speeter NASA, Portable Dextrous Force Feedback Master for Robot Telemanipulation (PDMFF) pp. 153-161, Technical Report Server (NTRS), NJ ,USA, Jan. 31, 1989.

Burdea et al., A Distributed Virtual Environment with Dextrous Force Feedback, Informatigue '92, International Conference Interface to Real and Virtual Worlds, Rutgers University EC2, Conference Mar. 23-27, 1992, NJ, USA.

J. Capowski, Remote Manipulators as a Computer Input Device, University Microfilms, A XEROX Company, Ann Arbor, Michigan UMI Dissertation Services. 1971- Michigan USA.

Cover et al., Interactively Deformable Models for Surgery Simulation (Object Modeling), Computer Graphics & Applications IEEE pp. 68-75, Atlanta, GA, USA, 1993.

J. S. Denson and S. Abrahamson, A Computer-Controlled Patient Simulator, Apr. 21, 1969—vol. 208, No. 3 pp. 504-508, LA, USA.

D. Gillies and C. Williams, London UK, An Interactive Graphic Simulator for the Teaching of Fibrendoscopic Techniques, Eurographics '87 Elsevier Science Publishers B.V North Holland, pp. 127-138.

Gillies, Haritsis and Williams, Computer Simulation for Teaching Endoscopic Procedures, Endoscopy, Supplement II, vol. 24, Jul. 1992. pp. 455-550.

A. Haritsis D. Gillies Ch. Williams (Eurographics), Realistic Generation and Real Time Animation of Images of the Human Colon, Computer Graphics Forum, vol. II No. 3, conference issue - Sep. 7-11, 1992. NNC Blackwell.

Haritsis 1992 (Hellenic), A.Haritsis D. Gillies Ch. Williams, Computer Simulation: New Horizons in Endoscopy Teaching, Hellenic Journal of Gastroenterology 1992 pp. 54-63, London UK.

G. Higgins, et al. Higgins 1995 (Surg. Tech. Int'l IV), Virtual Reality Surgery: Implementation of a Coronary Angioplasty Training Simulator. University Medical Press, San Francisco, 1995. pp. 379-383.

D. Hon, Ixion's Laparoscopic Surgical Skills Simulator Symposium: Medicine Meets Virtual Reality II Jan. 27-30, 1994, San Diego, USA.

D. Hon, Ixion's Realistic Medical Simulations Virtual Reality World, vol. 2, No. 4 Jul. / Aug. 1994 pp. 58-62.

H. Iwata, Artificial Reality with Force-feedback: Development of Desktop Virtual Space with Compact Master Manipulator. ACM SIGGRPAH 1990 Computer Graphics & Interactive Techniques vol. 24, No. 4. pp. 165-170, Aug. 6-10, 1990.

B.G Jackson L.B Rosenberg, Force Feedback and Medical Simulation, IOS Press and Ohmsha, Jan. 19-22, 1995 pp. 147-151- CA, USA.

P.J. Kilpatrick, Kilpatrick Thesis 1976 pp. 11-27, The Use of a Kinesthetic Supplement in an Interactive Graphics System. The University of North Carolina, USA.

Kotoku et al. A Force Display System for Virtual Environments and its Evaluation, International Workshop on Robot and Human Communication IEEE, Sep. 1-3, 1992 pp. 246-251—Ibaraki, Japan.

U.G. Kuhnapfel, Realtime Graphical Computer Simulation for Endoscopic Surgery Symposium: Medicine Meets Virtual Reality II, Jan. 27-30, 1994 San Diego, CA, USA.

U.G.Kuhnapfel et al., Endo surgery simulations with KISMET: a flexible tool for surgical instrument design, operation room planning and VR technology based abdominal surgery training. Virtual Reality World '95, Conference Stuttgart, Germany Computerwoche Verlag, 1995. pp. 165-171.

B. Marcus, Feedback Technology and Virtual Environments, pp. 87-95, Jul. 1-3, 1992 - 1992 International Conference on Artificial Reality and Telexistence (ICAT 1992) pp. 87-95.

Mark et al., Adding Force Feedback to Graphics Systems: Issues and Solutions, Aug. 4-9, 1996 ACM SIGGRAPH 1996 Computer Graphics Proceedings, Annual Conference, Chapel Hill. North Carolina, USA.

T.H. Massie, Design of a Three Degree of Freedom Force-Reflecting Haptic Interface, MIT, USA, Thesis - pp. 6-38, May 18, 1993 Submitted May 17, 1993.

K.T. Mcgovern et al., The Virtual Clinic™, A Virtual Reality Surgical Simulator Symposium: Medicine Meets Virtual Reality II pp. 151-157, Jan. 27-30, 1994 San-Diego CA, USA.

D. Meglan, Making Surgical Simulation Real, ACM SIGGRAPH Computer Graphics, pp. 37-39 Nov. 1996 Rockville, MD, USA.

Meglan et al., The Teleos Virtual Environment Toolkit for Simulation-Based Surgical Education, Interactive Technology and the New Paradigm for Healthcare Proceeding of MMVR 3, IOS Press and Ohmsha pp. 346-351. Jan. 17-20, 1996 San-Diego CA, USA.

J. R. Merril, The Future of Virtual Reality, Medicine, and the Information Superhighway, Journal of Knowledge Engineering & Technology, vol. 7, No. 1, Spring 1994 pp. 33-35, MD, USA.

Merril et al., Photorealistic Interactive Three- Dimensional Graphics in Surgical Simulation, Interactive Technology and the New Paradigm for Healthcare Proceeding of MMVR 3, IOS Press and Ohmsha pp. 244-252, Jan. 19-22, 1995 San Diego, USA.

Merril et al., Surgical Simulation Using Virtual Reality Technology: Design, Implementation, and Implications. Surgical Technology International III, 1994 pp. 53-60. Published by Universal Medical Press, CA, USA.

Merril et al., Virtual Heart Surgery - Trade Show and Medical Education, 1994 Virtual Reality World pp. 55-57 Jul./Aug. 1994, MD, USA.

Merril et al, Cyber Surgery - Cutting Costs, Sewing Benefits, The Virtual Reality Special Report, Miller Freedman Inc. Summer 1994 pp. 39-42, MD, USA.

Minsky et al., Feeling and Seeing: Issues in Force Display, ACM 1990 pp. 235-243, CA, USA.

M.D. Noar N. Soehendra, Endoscopy Simulation Training Devices Endoscopy 1992, vol. 24 pp. 159-166, Georg Thieme Vering Stuttgart. New York.

M.D. Noar, Robotics Interactive Simulation of RCP Sphincterotomy and EGD, Endoscopy 1992, vol. 24, pp. 539-541, Supplement 2, Georg Thieme Vering Stuttgart. New York.

A. M. Noll, Man-Machine Tactile Communication, Polytechnic Institute of Brooklyn, Jun. 1971, pp. 1V-X111 and 1-87.

Ernest M. Otani, Software Tools for Dynamic and Kinematic Modeling of Human Emotion, Department of Computer & Information Science, Technical Reports (CIS) University of Pennsylvania, Jul. 1989, pp. 1-74.

M. Ouh-Young, Force Display in Molecular Docking, UNC, The University of North Carolina at Chapel Hill 1990, pp. 1-369.

J. Peifer, et al., Medicine Meets Virtual Reality, Health Care in the Information Age, Applied Virtual Reality for Simulation of Endoscopic Retrograde Cholangio-Pancreatography, IOM Press, Proceedings of Medicine Meets Virtual Reality 4, San Diego, California, Jan. 17-20, 1996, pp. 36-42.

S. Pieper et al., Stereoscopic Displays and Applications II, Virtual environment system for simulation of leg surgery, SPIE vol. 1457, Feb. 25-27, 1991, pp. 188-197.

S. Pieper et al., Interactive Graphics for Plastic Surgery: a task-level analysis and Implementation, 1992 ACM Computer Graphics Special Issue on 1992 Symposium on Interactive 3D Graphics, Cambridge, MA Mar. 29- Apr. 1, 1992, pp. 127-134.

D. Popa, Simulation of Lumbar Puncture Procedure using Force Feedback in Virtual Environments, Thayer School of Engineering, Dartmouth College, Hanover, New Hampshire, Jun. 1994, pp. 1-134.

Preminger et al., Medicine Meets Virtual Reality, Health Care in the Information Age, Virtual Reality Surgical Simulation in Endoscopic Urologic Surgery, IOM Press, Proceedings of Medicine Meets Virtual Reality 4, San Diego, California, Jan. 17-20, 1996, Chapter 19, pp. 157-163.

L.B Rosenberg, B.G Jackson, Foot-Based Interfaces to Virtual Environments Using the Immersion Interface Box (TM), Virtual Reality and Persons With Disabilities, Second Annual International Conference, Jun. 8-10, 1994, pp. 145-148.

L.B Rosenberg, "Virtual Fixtures" - Perceptual overlays enhance operator performance in telepresence tasks, Stanford University, Aug. 1994. pp. 1-214.

M. A. Russo, The Design and Implementation of a Three Degree of Freedom of Freedom Force Output Joystick, MIT, May 11, 1990. pp. 1-131.

Salisbury et al., Haptic Rendering: Programming Touch Interaction with Virtual Objects, Symposium on Interactive 3D Graphics, 1995 ACM, pp. 123-130.

S. S. Saliterman, A Computerized Simulator for Critical-Care Training: New Technology for Medical Education, Scientific session of the Mayo Medical School Alumni Society, Nov. 4, 1989, pp. 968-978.

B. Schmult et al., Application Areas for a Force-Feedback Joystick, DSC vol. 49. Advances in Robotics, Mechatronics, and Haptic Interfaces ASME 1993, pp. 47-54.

Singh et al., Design of an Interactive Lumbar Puncture Simulator With Tactile Feedback, IEEE International Conference on Robotics and Automation, May 8-13, 1994, pp. 1734-1739.

M. Stanley and J. Colgate, Computer Simulation of Interacting Dynamic Mechanical Systems using Distributed Memory Parallel Processors, ASME Winter Annual Meeting, Symposium on Haptic Interfaces for Virtual Environment and Teleoperator Systems, Nov. 8-13, 1992, pp. 55-61.

Sharon A. Stansfield, Visually-Guided Haptic Object Recognition, University of Pennsylvania 1987 UMI, pp. 1-216.

I. Sutherland, The Ultimate Display for Production, Proceedings of the IFIP Congress 1965, pp. 506-508.

D. Terzopoulos and D. Metaxas, Dynamic 3D Models with Local and Global Deformations: Deformable Superquadrics, IEEE Transactions on Pattern Analysis and Machine Intelligence, vol. 13, No. 7, Aug. 30, 1990, pp. 703-714.

Williams, Baillie, Gillies, Borislow and Cotton, Teaching Gastrointestinal Endoscopy by Computer Simulation: a Prototype for Colonoscopy and ERCP, Gastrointestinal Endoscopy vol. 36, No. 1., 1990, pp. 49-54.

M. Winey III, Computer Simulated Visual and Tactile Feedback as an aid to Manipulator and Vehicle Control, MIT, Jul. 31, 1981, pp. 1-132.

O.C. Zienkiewicz, The Finite Element Method, McGRAW-Hill Book Company (UK) Limited, 1977, pp. 677-757.

Beth A. Marcus, Hands on: Haptic Feedback in Surgical Simulation, Exos, Inc., Jan. 27-30, 1994, pp. SIMB 004163-SIMB 004174.

Virtual Reality and Medicine the Cutting Edge, SIG Advanced Applications, Inc., Conference and Exhibition, Sep. 8-11, 1994, The New York Hilton.

Daane et al., A $100 Surgical Simulator For the IBM PC, Interactive Technology and the New Paradigm for Healthcare, Jan. 1995—pp. 79-80.

Higgins, U.S. Army Medical Research Grant Annual Report entitled "Medical Simulation for Trauma Management", Grant No. DAMD 17-94-J-4470, Oct. 1996.

Strutz et al., 3-D Guided Endoscopic Surgery of Paranasal Sinusese, Surgical Technology International IV, Oct. 1995, pp. 195-197.

Stone, Haptic Human-Computer Interaction—Haptic Feedback: A Brief History from Telepresence to Virtual Reality, Haptic Human-Computer Interaction, First International Workshop, Glasgow, UK Proceedings. Aug. 31-Sep. 1, 2000.

Loftin et al., A Virtual Environment for Laparoscopic Surgical Training, Medicine Meets Virtual Reality II: Interactive Technology & Healthcare, Jan. 1994.

Durrani et al., Advanced Endoscopic Imaging: 3-D Laparoscopic Endoscopy, Surgical Technology International III, Oct. 1994.

Johnston et al., Assessing a Virtual Reality Surgical Skills Simulator, Stud Health Technol Inform. 1996; 29:608-17.

Sheridan, Automatica the Journal of IFAC the International Federation of Automatic Control / Telerobotics. Automatica, vol. 25, No. 4, pp. 487-507, 1989.

Barfield et al, Virtual Environments and Advanced Interface Design, 1995 pp. 358-414.

Bejczy et al., Controlling Remote Manipulators Through Kinesthetic Coupling, Computers in Mechanical Engineering Jul. 1983, pp. 48-60.

Beer-Gable, Computer Assisted Training in Endoscopy (C.A.T.E.): From a Simulator to a Learning Station.Endoscopy, 1992; 24:suppl. 2: pp. 534-538.

Kuenhapfel et al., CAD-Based Graphical Computer Simulation in Endoscopic Surgery, Institute fur Angewandte Informatik, Kernforschumgszentr urn Karlsruhe, Germany, Oct. 1994.

Campos et al. A Robotic Haptic System Architecture, University of Pennsylvania, Dept. of Computer & Information Science Technical Reprot No. MS-CIS-00-51 1990.

Merril et al., Changing the Focus of Surgical Training, Virtual Reality World, Mar./Apr. 1995, pp. 56-60.

Szabo et al., Choreographed Instrument Movements During Laparoscopic Surgery: Needle Driving, Knot Tying, and Anastomosis Techniques. Medicine Meets Virtual Reality II; Interactive Technology & Healthcare, Jan. 1994. pp. 216-217.

Dumay, Cybersurgery, Medicine Meets Virtual Reality II. Interactive Technology & Healthcare, Jan. 1994.

Greenleaf, DataGlove and Datasuit: Virtual Reality Technology Applied to the Measurement of Human Movement. Medicine Meets Virtual Reality II. Interactive Technology & Healthcare, Jan. 1994, pp. 63-69.

Burdea et al., Dextrous Telerobotics with Force Feedback—An Overview, Part 1: Human Factors, Rutgers—The State University of New Jersey, Dept. of Electrical and Computer Engineering, Robotica (1991) vol. 9, pp. 171-178.

Online reference dated May 31, 1995, updates chapter 13 of the AutoCAD Release 13 Developers Guide, dated Apr. 14, 1995.

Brochure: Dynacath Simulator, Dynacath Minneapolis, MN, 1993.

Kuhn et al., Karlsruhe Endoscopic Surgery Trainer a "Virtual Reality" based Training System for Minimally Invasive Surgery.

Christensen, Bringing Telematics Into Health Care in the European Communities, Medicine Meets Virtual Reality II. Interactive Technology & Healthcare, Jan. 1994, 21-23.

Marcus et al., Exos Research on Master Controllers for Robotic Devices, NASA Technical Reports Server NTRS, pp. 238-245 Jan. 1, 1992.

Merril, VR for Medical Training and Trade Show "Fly-Pape": Virtual Reality World, May/Jun. 1994, pp. 53-57.

Burdea, Force and Touch Feedback for Virtual Reality, Electrical and Computer-Engineering Dept. Rutgers-The State University of New Jersey.

Baumann et al., Force Feedback for Virtual Reality Based Minimally Invasive Surgery Simulator, Medicine Meets Virtual Reality IV: Health Care in the Information Age, Jan. 1996.

Burdea Chapter 7, Force and Touch Feedback for Virtual Reality, Physical Modeling, John Wiley & Sons, Inc., pp. 168-223, 1996.

Jason Fritz, Haptic Rendering Techniques for Scientific Visualization, Jason P. Fritz Thesis at University of Delaware, Fall 1996.

Marcus, Hands on: Haptic Feedback in Surgical Simulation, Exos Inc. 2 A Gill St. Woburn, MA.

Rosenberg et al., A Haptic Interface for Virtual Simulation of Endoscopic Surgery, Medicine Meets Virtual Reality IV: Health Care in the Information Age, Jan. 1996 pp. 371-387.

Haritsis et al., Realistic Generation and Real Time Animation of Images of the Human Colon, 1992 Computer Graphics Forum, vol. II, No. 3, pp. C367-380, 1992.

Ho et al., IGES and PDES, The Current Status of Product Data Exchange Status, Dept. of Computer Science, Univ. of Mo-Rolla, Rolla MO, 1988 IEEE, pp. 210-216.

Hooper, The Interactive Assembly and Computer Animation of Reconfigurable Robotic Systems, Mechanical Engineering Dept. The University of Texas at Austin. 1990.

Rosenberg Louis B., Human Interface Hardware for Virtual Laparoscopic Surgery, Interactive Technology and the New Paradigm for Health Care, Immersion Corp. Santa Clara, CA. Chapter49, pp. 322-Jan 1995.

Funda et al., Image-guided Command and Control of a Surgical Robot, Medicine Meets Virtual Reality II. Interactive Technology & Healthcare, Jan. 1994.

Jaramaz et al. Integrating Finite Element Analysis Into Pre-Operative Surgical Planning And Simulation of Total Joint Replacement Surgery, Medicine Meets Virtual Reality II. Interactive Technology & Healthcare, Jan. 1994, pp. 34-37.

Merck & Co., An Introduction to the Robotic Endoscopy Simulator, 1989.

Hastreiter et al., Intuitive and Interactive Manipulation of 3D Datasets by Integrating Texture Mapping Based Volume, Rendering into the Open Inventor Class Hierarchy, Lehrstuhl fur Graphische Datenverarbeitung (MMD9), Universitat Erlangen.

Issacs et al. Controlling Dynamic Simulation with Kinematic Constraints, Behavior Functions and Inverse Dynamics, Computer Graphics vol. 21, No. 4, pp. 215-224, Jul. 1987.
Filerman et al., Issues in the Design of Tactile Input Devices for Mechanical CAD Systems, Massachusetts Institute of Technology, Artificial Intelligence Laboratory 1989.
Artificial Reality with Force-feed back: Development of Desktop Virtual Space with Compact Master Manipulator, Iwata Computer Graphics vol. 24, No. 4, pp. 165-170, Aug. 1990.
Hon, lxion's Laparoscopic Surgical Skills Simulator, Medicine Meets Virtual Reality II. Interactive Technology & Healthcare, Jan. 1994.
Kilpatrick, The use of a Kinesthetic Supplement in an Interactive Graphics System, Xerox University Microfilms 1976.
Kuhnapfel et al., Endosurgery Simulations with KISMET, Virtual Reality World, pp. 165-171 1995.
Immersion Corporation, Laparoscopic Impulse Engine Impulse Engine 2000™ Software Development Kit (Ver. 1.0)(Immersion), Immersion Corporation—Version 1.0 Mar. 1995.
McKensie et al., Lasers in Surgery and Medicine, Wessex Regional Medical Physics Service and Department of Otolaryngology, vol. 29, No. 6, pp. 619-641 1984.
Massie et al., The PHANTOM Haptic Interface: A Device for Probing Virtual Objects, Proceedings of the ASME Winter Annual Meeting, Symposium on Haptic Interfaces for Virtual Environment and Teleoperator Systems, Chicago, IL, Nov 1994.
McAfee et al, Teleoperator Subsystem-Telerobot Demonstrator: Force Reflecting Hand Controller Equipment Manual Jet Propulsion Laboratory, California Institute of Technology, pp. 3-11, Jan. 1988.
Poston et al., The Medical Reality Sculptor, Medicine Meets Virtual Reality II. Interactive Technology & Healthcare, Jan. 1994. pp. 174-176.
Satava, Medical Virtual Reality: the Current Status of the Future, Medicine Meets Virtual Reality IV: Health Care in the Information Age, Jan. 1996.
Merril et al., Virtual Reality for Trade Shows and Individual Physician Training, Virtual Reality Systems, pp. 40-44 Spring 2004.
Metaxas et al., Dynamic Deformation of Solid Primitives with Constraints, Computer Graphics Proceedings, Annual Conference Series, University of Toronto. pp. 309-312, 1992.
Flynn, Virtual Reality and Virtual Spaces Find a Niche in Real Medicine; Simulated Surgery on a Computer—This Won't Hurt. New York Times Jun. 5, 1995.
Massimo et al., One Handed Tracking in Six Degrees of Freedom, IEEE International Conference on Systems, MAN and Cybernetics, Massachusetts Institute of Technology, Man-Machine Systems Laboratory, vol. 1 of III, 1989.
Hannaford et al., Performance Evaluation of a Six-Axis Generalized Force-Reflecting Teleoperator, IEEE May/Jun. 1991, vol. 21, No. 3 pp. 620-633.
Merril, Presentation Material: Medicine Meets Virtual Reality II. Interactive Technology & Healthcare, Jan. 1994.
Immersion Human Interface Corporation, Immersion PROBE and Personal Digitizer, Programmers Technical Reference Manual: Immersion Probe and Personal Digitizer May 19 1994.
Durlach, Psychophysical Considerations In The Design of Human-Machine Interfaces For Teleoperator And Virtual-Environment Systems, Medicine Meets Virtual Reality II. Interactive Technology & Healthcare, Jan. 1994 pp. 45-47.
Hubner et al., Real-Time Volume Visualization of Medical Image Data for Diagnostic and Navigational Purposes in Computer Aided Surgery, Proc., Computer Assisted Radiology, CAR'96 Paris, pp. 751-756 Jun. 26-29 1996.
Merril et al., Revealing the Mysteries of the Brain with VR, Virtual Reality Special Report, Winter 1994, pp. 61-65.
Neisius et al., Robotic Telemanipulator for Laparoscopy, 1995 IEEE-EMBC and CMBEC Theme 5: Neuromuscular Systems/Biomechamics, pp. 1199-1200.1995.
Sato et at., Space Interface Device for Artificial Reality—SPIDAR, System and Computers in Japan, vol. 23, No. 12, pp. 44-54, 1993.
Galyean et al. Sculpting: An Interactive Volumetric Modeling Technique, Computer Graphics, vol. 25, No. 4, 1991.

Medical World News, Virtual Reality Shapes Surgeon's Skills, Medical World News, Feb. 1994, pp. 26-27.
Hon, Tactile and Visual Simulation: a Realistic Endoscopy Experience, Medicine Meets Virtual Reality: Discovering Applications for 3-D Multi-Media Interactive Technology in the Health Sciences, Jun. 4-7, 1992.
Johnson, Tactile Feedback Enhancement to Laparoscopic Tools, Medicine Meets Virtual Reality II. Interactive Technology & Healthcare, Jan. 1994.
Fischer et al., Tactile Feedback for Endoscopic Surgery, Interactive Technology and the New Paradigm for Healthcare, Jan. 1995.
Peine et al., A Tactile Sensing and Display System for Surgical Applications, Interactive Technology and the New Paradigm for Healthcare, Jan. 1995 pp. 283-288.
Computer Procedures for Finite Element Analysis, Taylor Computer Procedures, the Finite Element Method, McCraw Hill, pp. 677-757, Computer Procedures for Finite Element Analysis.
Hunter et al., Teleoperated Microsurgical Robot and Associated Virtual Environment, Medicine Meets Virtual Reality II. Interactive Technology & Healthcare, Jan. 1994.
Holler et al., Teleprescence Systems for Application in Minimally Invasive Surgery, Medicine Meets Virtual Reality II. Interactive Technology & Healthcare, Jan. 1994.
Sheridan, Telerobotics, Automatica vol. 25, No. 4, pp. 487-507, 1989.
Satava, Virtual Reality Surgical Simulator: The First Steps, Medicine Meets Virtual Reality: Discovering Applications for 3-D Multi-Media Interactive Technology in the Health Sciences—Jun. 4-7, 1992.
Frolich et al., The Responsive Workbench: A Virtual Working Environment for Physicians, Interactive Technology and the New Paradigm for Healthcare, Jan. 1995, pp. 118-119.
Doyle et al., The Virtual Embryo: VR Applications in Human Developmental Anatomy, Medicine Meets Virtual Reality II: Interactive Technology & Healthcare, Jan. 1994, pp. 38-41.
Bailie, Gastrointestinal Endoscopy: Time for Change, Scott Med J. Feb. 1989; 34 (1): 389-90.
Song et al., Tissue Cutting in Virtual Environments, Interactive Technology and the New Paradigm for Healthcare, Jan. 1995.
Gyeong-Jae et al., Tissue Cutting in Virtual Environments, Interactive Technology and the New Paradigm for Healthcare, Jan. 1995 359-364J.
Sukthankar, Towards Virtual Reality of "Tissue Squeezing": A Feasibility Study, Medicine Meets Virtual Reality II: Interactive Technology & Healthcare, Jan. 1994, pp. 182-186.
Adachi, Touch and Trace on the Free-Form Surface of Virtual Object, Proceedings of IEEE Virtual Reality Annual International Symposium—Sep. 18-22, 1993 Seattle, WA pp. 162-168.
Trevidi et al., Developing Sensor-Based Robotic System Using Virtual Reality Concepts, Proceedings for the ANS Fifth Topical Meeting on Robotics and Robotic Systems Knoxsville, TN/Apr. 25-30, vol. 1, pp. 165-172.
CH Products, CH Products Virtual Pilot Control Yoke 1993.
Henderson, "Virtual Realities" as Instructional Technology, Journal of Interactive Instruction Development, pp. 24-30, 1991
Hoffman, Virtual Reality and the Medical Curriculum: Integrating Extant and Emerging Technologies Medicine Meets Virtual Reality II: Interactive Technology & Healthcare, Jan. 1994 pp. 73-76.
Burdea et al., Virtual Reality Technology, Chap. 6, pp. 221-242. Wiley-Interscience 2003.
Iwata et al., Volume Haptization, IEEE 1993, pp. 16-18.
Anon., VR in Medicine, VR News; Apr. 1996 vol. 5, Issue 3.
Ota et al., Virtual Reality in Surgical Education, ComputBiol Med., Mar. 1995, 25(2): 127-37.
MacDonald et al., Virtual Reality Technology Applied to Anesthesiology, Interactive Technology and the New Paradigm for Healthcare, Jan. 1995.
Bell et al., The Virtual Reality Modeling Language, version 1.0 Specification 1996.
Merril, Why I Simulate Surgery . . . Virtual Reality World, Nov./Dec. 1994, pp. 54-57.

* cited by examiner

Coarser LOD Model

Mid-Range LOD Model

Refined LOD Model

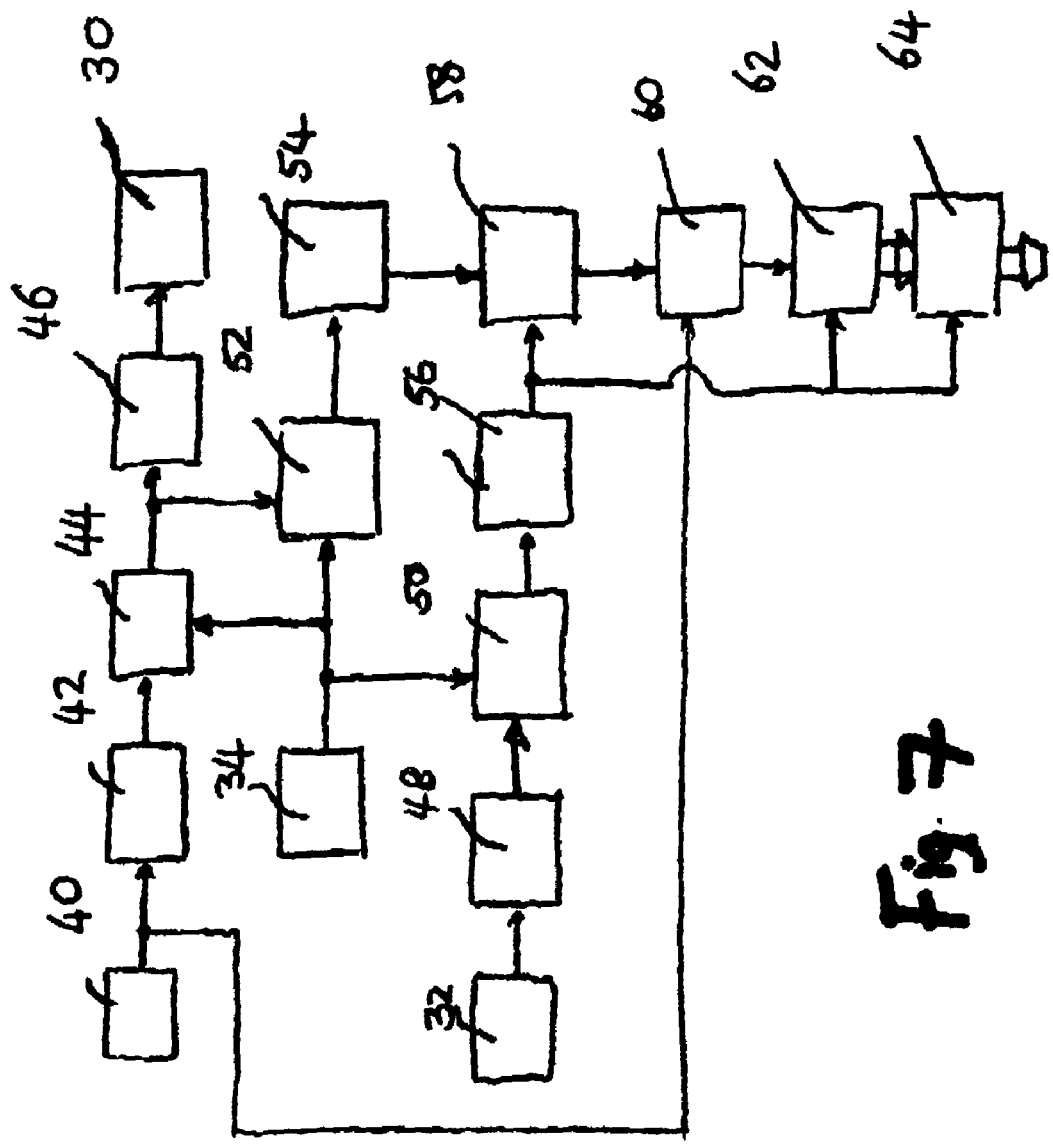

SURGICAL SIMULATION DEVICE, SYSTEM AND METHOD

RELATIONSHIP TO EXISTING APPLICATIONS

The present application claims priority from U.S. Provisional Patent Application No. 60/486,905 filed Jul. 15, 2003, the contents of which are hereby incorporated by reference.

FIELD OF THE INVENTION

The present invention is a device, system and method for simulating surgical procedures, and more particularly but not exclusively, for the simulation of surgical, including laparoscopic procedures for the purposes of instruction and/or demonstration.

BACKGROUND OF THE INVENTION

It is known generally in the background art to use the physical behavior model of a system combined from springs and damps. This behavior model is well known and has bee under use in the field of computer 3D graphics and 3D animation of non-rigid objects since the late 1980's.

However, such a model has not been applied to a system in which a complex physical model is constructed and also complex physical interactions must be represented. One example of such a system is the simulation of a medical procedure on a body organ, particularly a surgical procedure. Surgical procedures involve the, manipulation of tools and of organs, and physical interactions between these two relatively complicated types of physical models.

One example of such a surgical procedure is laparoscopy surgery. Laparoscopy is a procedure that permits visual examination of the abdominal cavity with an optical instrument called a laparoscopic, which is inserted through a small incision made in the abdominal wall. The laparoscopic system includes monitor, camera and video, insufflators for $CO_2$, laparoscope and instruments.

The fiber optics also carry light into the abdomen from a special light source. This system allows the surgeon to see and operate within the abdomen.

The procedure is usually performed under general anesthesia After anesthesia is begun, 3-4 small incisions (called port sites) are made on the abdominal wall. A Veress needle is inserted into the abdomen to inflate the abdomen with CO2. This distends the abdomen and creates space to insert the trocars for the laparoscope and the instruments.

The laparoscope and instruments with long handles are inserted through the trocars into the abdomen The entire operation is then performed while viewing the organs magnified on a television screen.

Such an operation is clearly difficult to simulate, given the relatively large number of different types of interactions and physical models which must be simultaneously handled in real time.

SUMMARY OF THE INVENTION

The present embodiments overcome the above deficiencies of the background art by providing a device, system and method for simulating laparoscopic procedures, particularly for the purposes of instruction and/or demonstration. The present embodiments are capable of simulating organ movement, cutting, suturing, coagulations and other surgical and surgery-related operations.

According to preferred features of the present invention, there is provided a mechanism for the simulation of multiple tools within the surgery environment, as well as the interaction between simulated organs and simulated tools.

According to one aspect of the present invention there is provided a virtual organ for use in simulated medical procedures, the organ comprising:

a plurality of elements, each element having neighboring elements;

a plurality of tensioned connections connecting neighboring elements over said organ, such that force applied at one of said elements propagates via respective neighboring elements to provide a distributed reaction over said organ.

The virtual organ may comprise a network of spline curves to simulate a blood circulation network of said organ.

Preferably, said spline curves are arranged in a tree and branch configuration.

Preferably, said spline curves are connected such that a force applied at one of said spline curves propagates through connected spline curves over said tree and branch configurations.

Preferably, said spline curves have respective lengths and are surrounded circumferentially by tubular meshes.

Preferably, said tubular meshes comprise radii that vary along said lengths.

Preferably, said tubular meshes comprise profiles that vary along said lengths.

Preferably, said tubular meshes comprise textures that vary along said lengths.

Preferably, at least one of said elements is a core element whose movement under application of a force is subject to an additional constraint.

Preferably, said core element is connected to a control point of a spline curve simulating a blood vessel, thereby to cause said additional constraint to propagate to said spline curve.

Preferably, said core element is part of an outer skin of said or and said additional constraint is to retain said core element in a pr mine position, thereby to provide a restorative force to neighboring elements thereof.

The virtual organ may be configured to be temporarily disconnected from said at least one core element to allow a global movement of said organ.

The virtual organ may fez be configured to permit connection of additional tensioned connections to oppositely facing elements thereof during said global movement.

The virtual organ may comprise at least one additional element to provide a gravitational effect on said organ.

The virtual organ may be associated with a tracking arrangement, wherein said force is applied thereto in accordance with tracking of a physical tool by said tracking arrangement.

Preferably, said tracking arrangement is an optical tracking arrangement.

Additionally or alternatively, said tracking arrangement includes an ultrasound tracking arrangement.

According to a second aspect of the present invention there is provided a system for simulation of a surgical procedure comprising:

a) at least one virus organ comprising:
  a plurality of elements, each element having neighboring elements; and
  a plurality of tensioned connections connecting neighboring elements over said organ, such that force applied at one of said elements propagates via respective neighboring elements provides a distributed reaction over said organ;

b) a physical manipulation device for manipulation by a user; and c) a tracking arrangement for tracking said physical manipulation device and translating motion of said physical manipulation device into application of forces onto said virtual organ.

The system may comprise a feedback unit or element for providing force feed back to said physical manipulation device.

Preferably, said physical manipulation device is a laparoscopy tool.

Preferably, said tacking arrangement is an optical tracking arrangement.

Preferably, said tracking arrangement is or additionally includes an ultrasound tracking arrangement.

Preferably, said virtual organ further comprises a network of spline curves to simulate a blood circulation network of said organ.

Preferably, said spline curves are arranged in a tree and branch configuration.

Preferably, said spline curves arc connected such that a force applied at one of said spline curves propagates through connected spline curves over said tree and branch configurations.

Preferably, said spline curves have respective lengths and are surrounded circumferentially by tubular meshes.

Preferably, said tubular meshes comprise radii tat vary along said lengths.

Preferably, said tubular meshes comprise profiles that vary along said lengths.

Preferably, said tubular meshes comprise textures that vary along said lengths.

Preferably, at least one of said elements is a core element whose movement under application of a force is subject to an additional constraint.

Preferably, said core element is connected to a control point of a spline curve simulating a blood vessel, thereby to cause said motion constraint to propagate to said spline curve.

According to a third aspect of the present invention them is provided a method for simulating an interaction with an organ, comprising:

constructing a simulated organ using a plurality of particles and spring/damper (SD) sets, ones of said plurality of particles being connected to others of said particles by said SD set, thereby to provide a plurality of connected particles to collectively model a mechanical geometric behavior of the organ;

simulating a physical force on the organ by applying a simulated instrument to a location on said organ corresponding to at least one of said particles, said force being allowed to alter at least one physical characteristic of the organ according to application of said force to said at least one of said particles directly, and according to application of said force indirectly via said SD set to others of said particles; thereby to include indirect effects of said force over said organ in said simulating.

Preferably, said constructing a simulated organ further comprises adding a tree structure of spline curves within said organ to simulate blood vessels.

Preferably, said adding a tree structure comprises surrounding respective ones of said spline curves with meshworks of variable radii.

Preferably, said constructing said simulated organ comprises adding a structure of elastic elements to simulate connecting tissue of said organ.

Preferably, said simulated instrument is a simulated surgical instrument.

Preferably, said simulated instrument is a simulated laparoscopy instrument.

Preferably, said simulating a physical force is simulating any one of a group comprising: moving said organ, cutting said organ, pressing said organ, suturing said organ, and carrying out a coagulation at said organ.

The method may comprise linking each of said particles to each neighboring particle via one of said SD sets, such that motion at each particle brings about secondary motion at neighbors thereof.

The method may comprise constructing said elastic elements to simulate physical properties of elastic bands.

The method may comprise connecting said elastic elements to two points in the simulated organ.

The method may comprise a simulation of deformations as a result of interaction with other virtual objects using sliding contact points.

The method may comprise configuring said elastic elements to apply forces back to points of connection or contact points as a result of stretching or deformation of said elastic elements.

The method may comprise:

constructing a visual display model of the organ according to a plurality of polygons, said polygons being connected at vertices of said polygons;

determining a correspondence between each particle and each vertex; and simulating a visual display of the organ according to said simulation of the organ and according to said correspondence.

According to a fourth aspect of the present invention there is provided a method for simulating a surgical procedure on a body component, comprising:

constructing at least the body component as a plurality of particles and spring/damper (SD) sets, wherein at least one of said plurality of particles is connected by at least one SD set to at least one other particle, such that movement at one of said connected particles leads to an effect on another particle connected thereto; and simulating a physical interaction with a physical force on at least one of said particles, such that said physical interaction propagates over the body component via respectively connected SD sets following application of said force to said at least one particle; wherein said physical interaction is part of said surgical procedure.

The method may comprise altering a visual display of at least the body component at least partially according to said physical interaction.

Preferably, said alteration of said visual display is performed by:

constructing a visual display model of at least the body component according to a plurality of polygons, said polygons being connected at vertices of said polygons;

determining a correspondence between each particle and each vertex; and simulating a visual display of at least the body component according to said simulation of at least the body component and according to said correspondence.

The method may comprise performing said physical interaction according to a behavior of a simulated tool.

The method may comprise using tracking of a physical manipulation device to define said behavior of said simulated tool.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the preset invention only, and are presented in order to provide what is believed to be the most useful and readily understood description of the principles and conceptual aspects of the invention In this regard, no attempt is made to show structural details of the invention in more detail than is necessary for a fundamental understanding of the invention, the description taken with the drawings making apparent to those skilled in the art how the several forms of the invention may be embodied in practice.

With reference to the drawings:

FIG. 7 is a simplified diagram illustrating a measuring circuit for generating and then measuring ultrasound signals.

DESCRIPTION OF THE PREFERRED EMBODIMENTS

Figure 1:
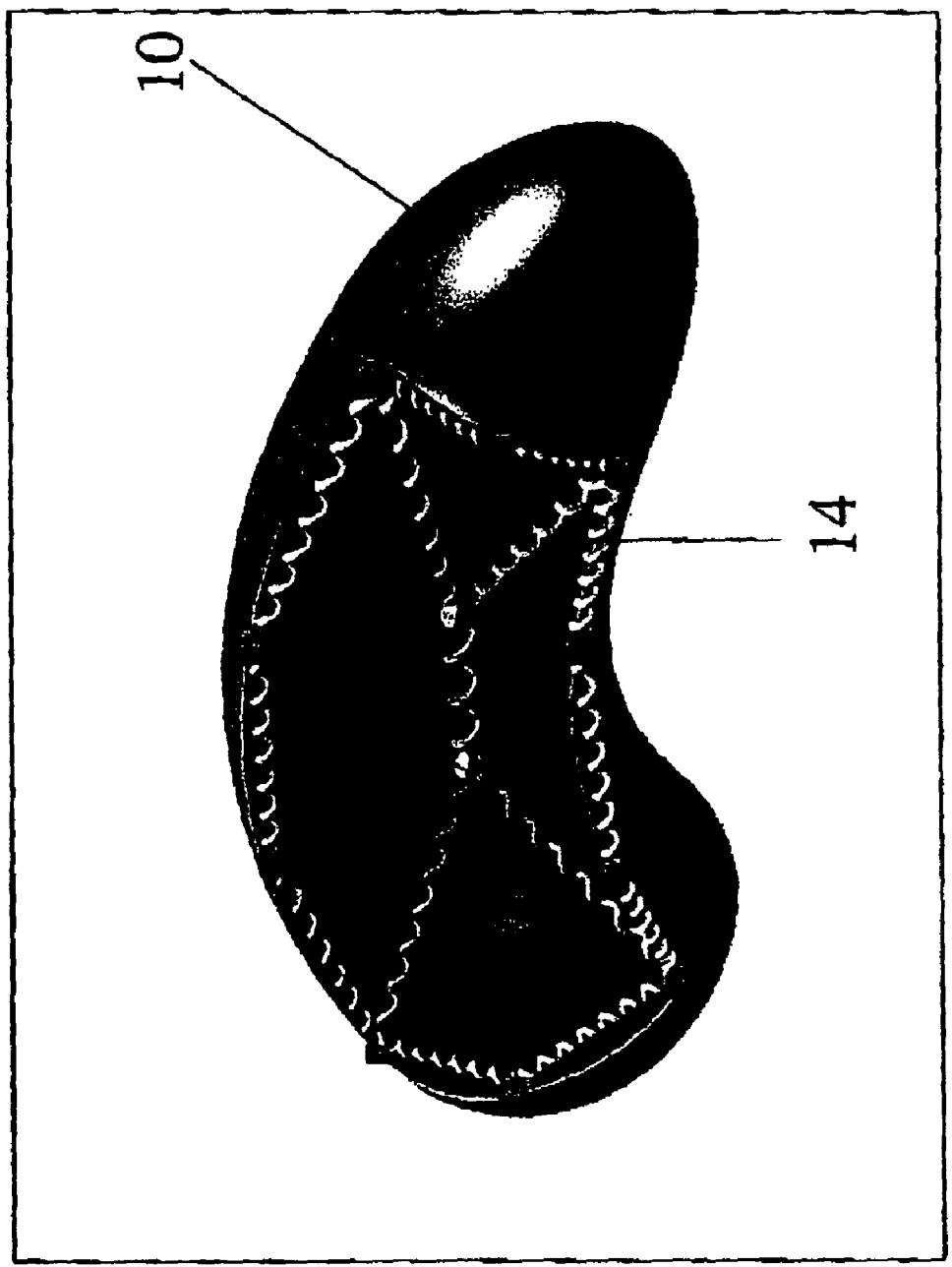
FIG. 1 shows a scheme of an exemplary physical model according to the present invention.

The present invention is of a device, system and method for simulating laparoscopic procedures, particularly for the purposes of instruction and/or demonstration. The present invention is capable of simulating organs moving, cutting, suturing, coagulations and other surgical and surgery-related operations.

According to the system of the present embodiments, a plurality of working tools is provided, optionally and preferably with at least one camera. The movement of the tools is preferably detected by at least two and more preferably up to four full 3D tracking devices (for example, two Mini Bird 3D sensors by Ascension), and the camera is preferably operated either by a 3D mouse (CyberPuck) or a 3D tracking device. The last device is more preferably used for tracking in three dimensions only, while the 3D sensing devices which are used for the tools more preferably have also the capability of providing Force-Feed-Back (FFB) to the user, hence giving the surgeon a sensation of touch with body tissues. An ultrasound embodiment is also described.

The principles and operation of a simulation system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2A:
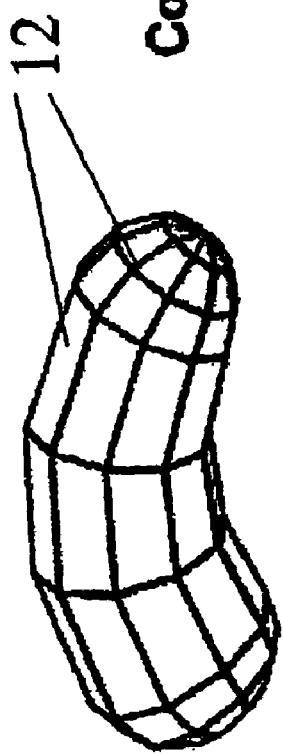
FIGS. 2A to 2C show a scheme of 3 LODs (levels of detail) of the model of FIG. 1.
Figure 2B:
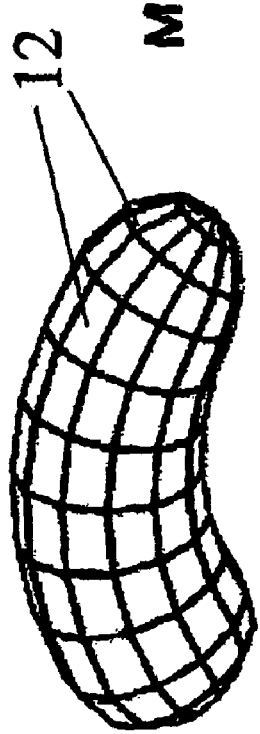
Figure 2C:
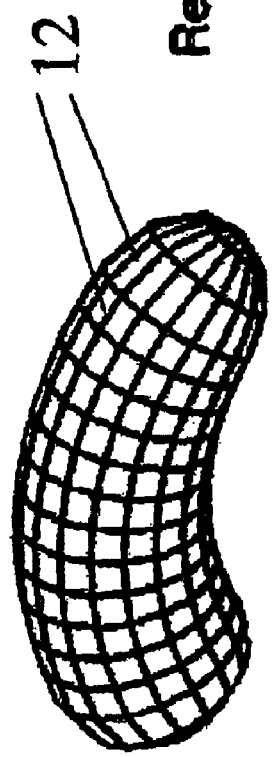

Reference is now made to FIG. 1, which shows a virtual organ for use in simulated medical procedures. Virtual organ 10 may be representative of any actual organ that it is desired to simulate. The virtual organ preferably comprises elements 12 (FIG. 2). The size of the elements is selected in designing the simulation so that the smaller the element the finer the accuracy of the model but the ger is the processing power needed. Examples of increasingly refined models, that is models with increasingly smaller sets of elements are shown in FIGS. 2A to 2C respectively. A particular simulation may move between different levels of refinement as required by the simulation or according to the available resources. Each element 12 has one or more neighboring elements, and a plurality of tensioned connections 14 define the interactions between the various neighboring elements over the organ. Consequently force applied at one of the elements propagates via respective neighboring elements to provide a distributed reaction over the organ. The tensioned connections are typically spring and damper type connections, that is being defined by a spring constant and a damping constant.

Figure 3:
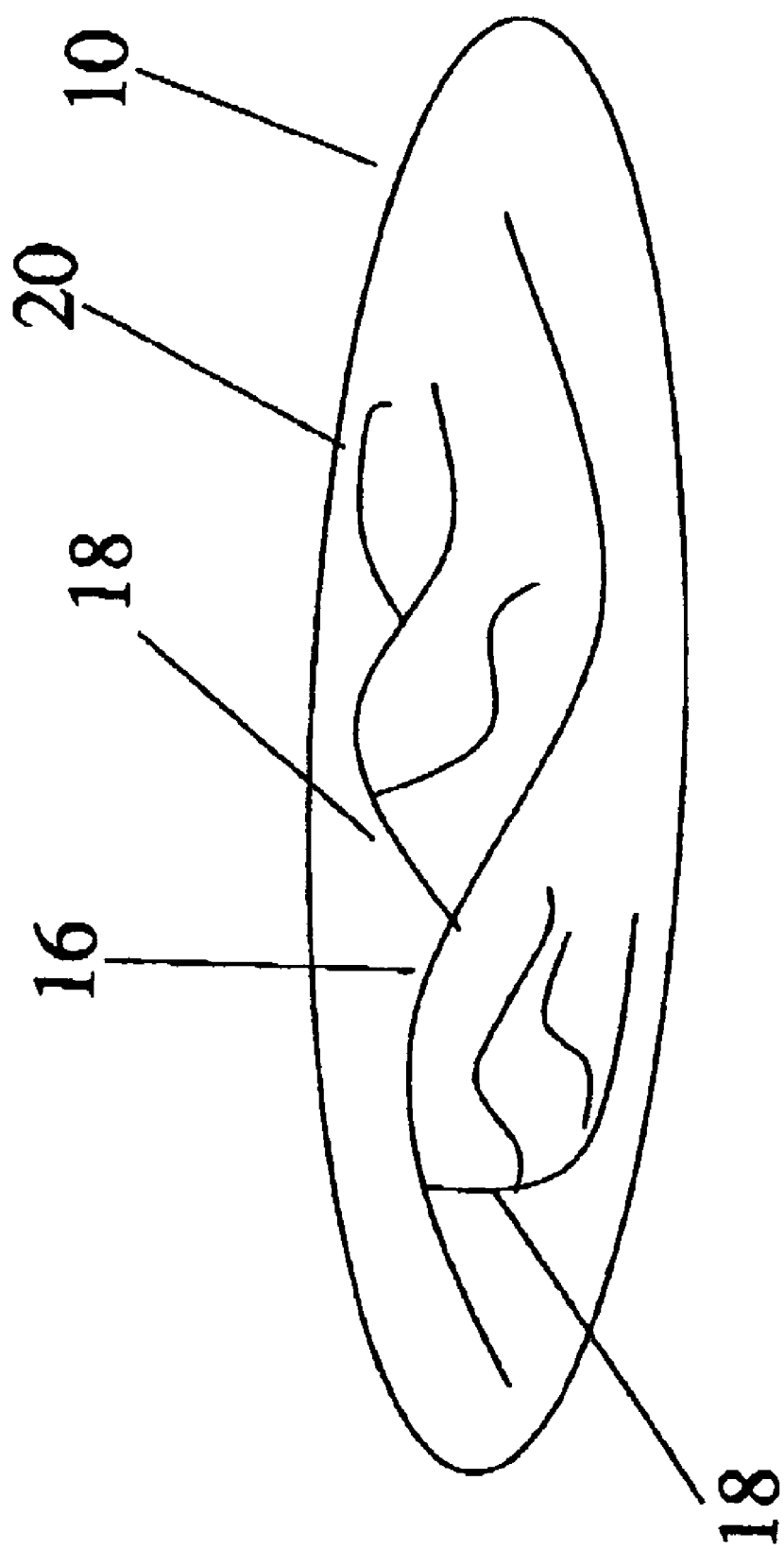
FIG. 3 is a simplified diagram showing spline curves being used in a tree and branch configuration to simulate blood vessel structure within the model of FIG. 1.

Reference is now made to FIG. 3, which illustrates a further embodiment of the model 10 which is designed to incorporate blood vessels. That is to say the model includes a network of spline curves to simulate a blood circulation network of the organ. A main stem 16 is formed from a first spline curve and branches 18 split therefrom. Secondary branches 20 split from the primary branches and the model can continue to the level of capillaries if desired.

The spline curves are connected such that a force applied at one of the spline cures propagates through connected spline curves over the tree and branch configurations of the network. That is to say properties of pull and stretch apply to the network.

Figure 4:
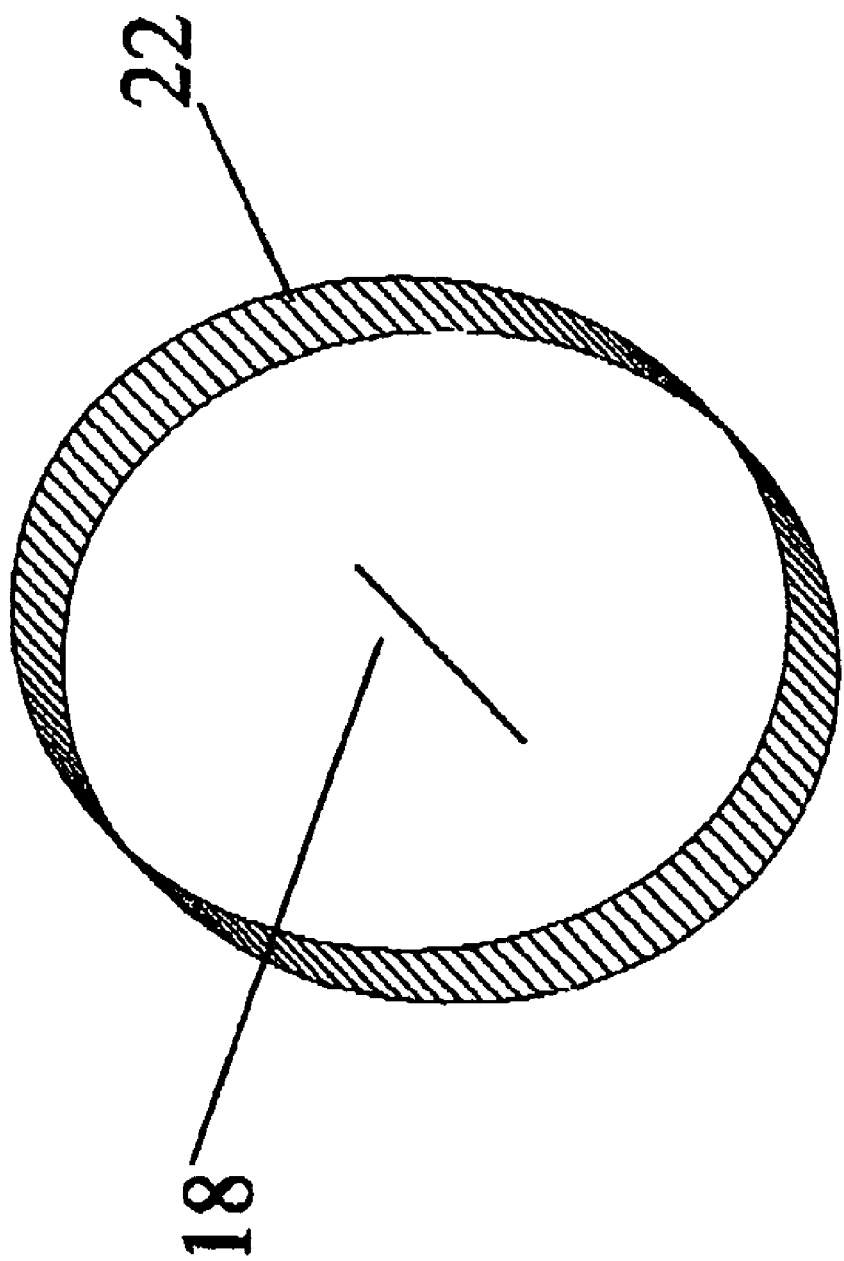
FIG. 4 is a simplified diagram illustrating suture applied to the spline curves of FIG. 3 to give 3D substance to the spline curves.

Reference is now made to FIG. 4, which is a simplified diagram showing how a three dimensional character is applied to the spline curves to simulate the blood vessel. As shown a spline curve 18 is surrounded circumferentially by a tubular meshwork 22. The tubular meshwork 22 may have a radius that successively decreases as one moves away from the stem of the network and as one moves down a level of the branch network. The tubular meshes 22 may be provided with profiles that vary along the lengths of the branch. Likewise they may be provided with textures that vary along said lengths, all in the interests of providing a more realistic model of the organ.

Certain elements can be defined with particular constraints on their movement, for example anchor elements. A real organ may at one of its locations be connected to bone for example, so that part of the organ does not move. Furthermore it is possible to define elements which are not part of the physical structure of the model but are there simply to provide constraints for other elements. Thus elements can be defined that are invisible in themselves in the display of the model, but serve as anchors for other elements.

Some of the core elements can be both invisible and part of the outer skin of the organ. The additional constraint applied to the core element can be to retain the core element in a predetermined position, that is it is an anchor element. In this way a restorative force acts on its neighboring elements, allowing the model to return to its shape following application of force.

One way to ensure that a model behaves elastically after being pressed inwards is to have its outer elements attached by a spring and damper connection to an element outside of its envelope which is defined as an anchor element.

In view of the above, certain elements may be defined as core elements, in that movement under application of a force is subject to an additional constraint.

A preferred way to simulate the way in which blood vessels move in relation to their surrounding tissue is to connect one of the core elements to a control point of the spline curve simulating a blood vessel. Hence the motion constraint of the core element is propagated into the spline curve.

A preferred embodiment of the organ is configured to be temporarily disconnected from one or more of its core or anchor elements to allow a global movement of the organ, should this be desired in the simulation.

Likewise the organ may be configured to permit connection of additional tensioned connections to oppositely facing elements thereof during any such global movement. This allows the simulation inter alia to incorporate the stickiness plus elasticity effect of pulling an organ from one end so that it first stretches and then the far end is released and snaps towards the first end.

Connecting tissues can be simulated by elastic elements. It is possible to configure the organ by constructing such elastic elements to simulate physical properties of elastic bands, and to constrain movement of the elements to which they are fixed. Typically such an element is connected to two points in the simulated organ.

It is possible to define one or more additional elements to provide a gravitational effect on the organ. Certain organs such as the liver tend to collapse under their own weight if not supported, and such gravitational element allow this effect to be simulated.

The purpose of the organ, in the preferred embodiments is to provide on-screen feedback to a surgeon operating an instrument so as to simulate a laparoscopy or other operation. Thus the virtual organ is part of a computer system that includes a tool, and an arrangement for tracking the tool, so that the surgeon's movements can be translated into forces and motions applied to the viral tool. The virtual organ is associated with the tracking arrangement, and force is applied to the virtual organ in accordance with tracking of the physical tool by the tracking arrangement. The tracking arrangement can be optically based or ultrasound based or way use any other suitable tracking system. It may use force feedback or the like as desired for a more realistic experience.

The physical tool or manipulation device can be a laparoscopy tool of any kind or any other kind of tool as suitable for the operation being simulated. Furthermore the tracking system may be set up to track multiple tools to simulate situations in which multiple tools are used simultaneously.

Figure 5:
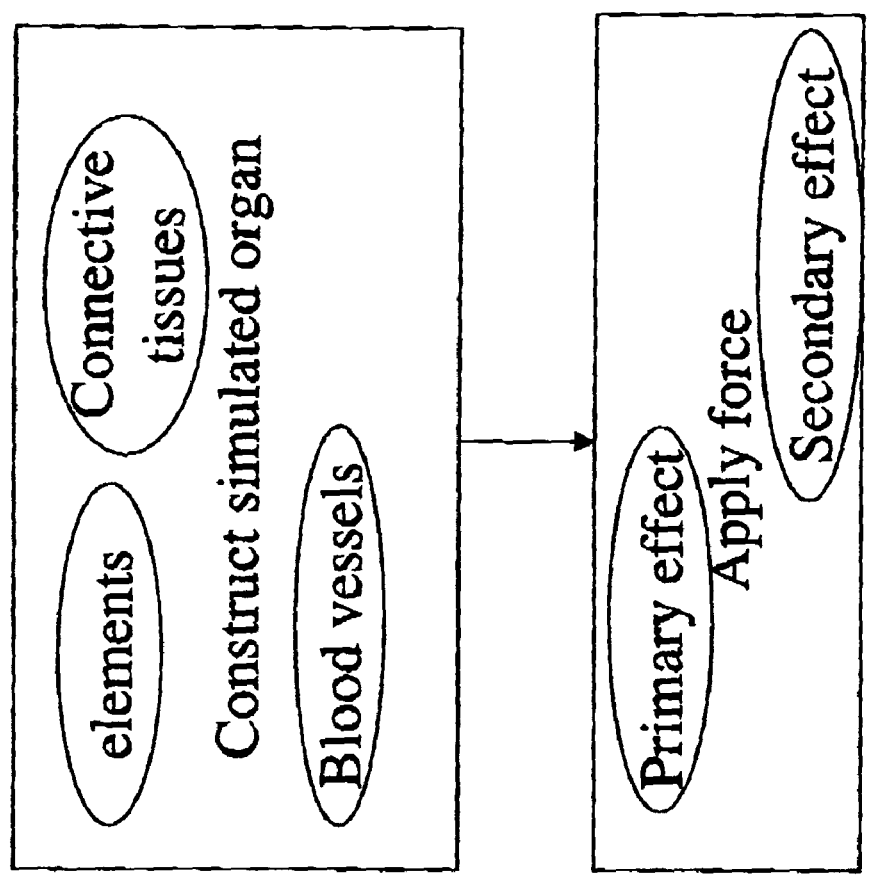
FIG. 5 is a simplified flow chart showing the two stage simulation process of the present embodiments.

Reference is now made to FIG. 5, which is a simplified flow chart showing a series of stages in carrying out the simulations described hereinabove. Such a simulation comprises a first stage of constructing a simulated organ using a plurality of elements or particles and spring/damper (SD) sets, the particles being connected to neighbours via SD sets, the result being connected particles to collectively model a mechanical geometric behavior of the organ.

A second stage is to simulate a physical force on the organ by applying a simulated instrument with a force to a location on the organ, and allowing the force to alter a physical characteristic of the organ as follows:

first of all a first order effect from application of the force to the particle directly at the point of contact, and secondly according to application of the force indirectly via the SD sets to other particles, so that the force propagates through the organ as secondary and higher order indirect effects.

Hence it is possible to include indirect effects of the force over the organ as part of the simulation.

Constructing a simulated organ preferably comprises adding a tree structure of spline curves within the organ to simulate blood vessels, as described above. The method may further include adding a structure of elastic elements to simulate connecting tissue.

A non-liming list of activities that may be simulated includes moving the organ, cutting the organ, pressing the organ, suturing the organ, and carrying out a coagulation at the organ.

It is further possible to simulate deformations as a result of interaction with other virtual objects by using sliding contact points.

It is further possible to configure the model by applying forces back to points of connection or contact points as a result of stretching or deformation of the elastic elements.

Preferably the method comprises stages of:

constructing a visual display model of the organ according to numerous polygons, the polygons being connected at their vertices as is well known in the three-dimensional modeling field;

determining a correspondence between each particle and each vertex; and simulating a visual display of the organ according to the simulation of the organ and according to the correspondence.

According to preferred embodiments of the present invention, it is not a mere organ that is simulated but an organ within a virtual body. A mechanism is provided for supporting the penetration of the virtual body of the patient from any location, such that the surgeon (or other individual performing the simulated operation) can select the best entry point for the current operation. The present invention enables a trocar and/or any desired tool to be inserted into the simulated body at any chosen location, thereby providing a realistic simulation of the trocar insertion stage in a laparoscopic procedure.

The different tools that are needed for the operation can optionally be chosen from a tool menu. Therefore, when the 3D sensor passes a predefined calibration plane the desired virtual tool is simulated on the screen as entering the working zone. This feature may also be used to allow the visualization of picking the best penetration point for the trocar to be inserted. For example, the user can preferably actually see the stomach exterior tissue being pushed by the trocar needle before inserting it by penetrating the plane.

Figure 6:
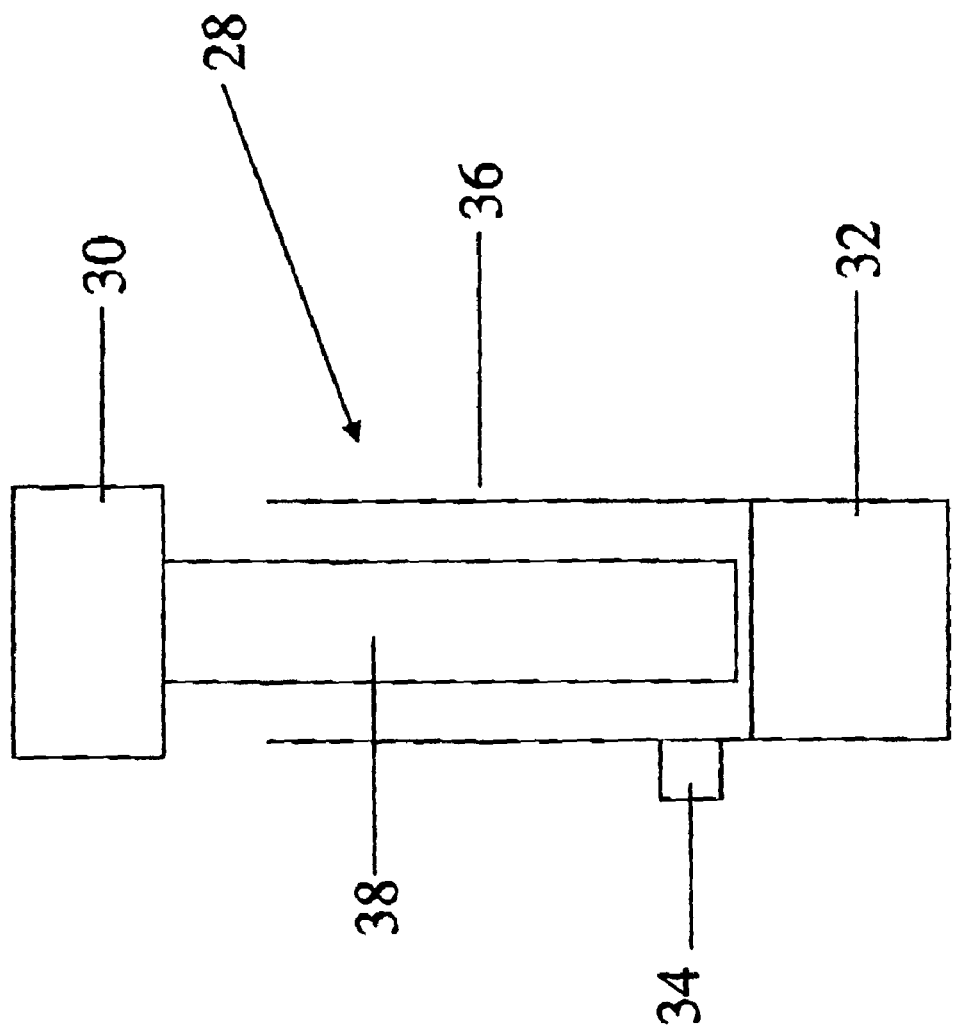
FIG. 6 is a simplified diagram illustrating an arrangement for using ultrasonic detection to translate user operation of a tool into electronic data for application to the virtual organ.

Reference is now made to FIG. 6 which illustrates a tool 28 for use in a simulated laparoscopy operation, and which uses ultrasound for obtaining location data. The tool is designed to have the look and feel of a real tool used for laparoscopy. The tool has an ultrasound transmitter 30, an ultrasound receiver 32, an optical receiver 34 which detects the tool having reached the end of its travel, a static tube or trocar 36 and a mobile tube, the actual tool or laparoscope 38. The user moves the mobile tube 38 within he car 36, and the signals from the ultrasound receiver and the optical receiver are translated into digital effects on thc organ.

Reference is now made to FIG. 7, which is a simplified block diagram of an ultrasound system for producing signals an measuring distances thereby. Crystal oscillator 40 produces a master clock. Counter 42 divides the master clock to produce the resonant frequency for the ultrasound transmitter. The signal is enabled at gate 44 by the output of sensor 34, buffered at buffer 46, and delivered to the trotter 30.

The ultrasound signal from transmitter 30 is then received at receiver 32 with a delay time or phase which corresponds to the distance between transmitter 30 and detector 32. The received signal is then transformed at pulse shaper 48.

Counters 50 and 52 are reset by the signal from optical detector 34. Counter 52 counts the transmitting signal and counter 50 counts the received signal. Both counters divide the signals by the same N number in concordance with the minimum distance to be measured.

The Qn counters outputs both set and reset via pulse formers 54 and 56 and flip-flop 58.

The out signal from flip flop 58 is used to enable the master clock signal received at gate 60 to reach the clock input of counter 62. The out pulse from pulse former 56 resets the flip-flop 58, thereby clocking latch 64 to retain curt count data from counter 62, and then resets counter 62 for the next measurement.

The simulator handles a full range of organs in the area of the lower stomach, as well as organs such as the Liver, the Colon, Gall Bladder, Pancreas, Spleen, Stomach, and so forth. Each of the organs is more preferably simulated according to its own unique shape, texture and physical behavior, so that the simulated organ has an appearance and behavior which is at least somewhat similar to the behavior of the real organ in a real operation.

The physical behavior of the simulated organ is determined according to an organ model. Each organ model is preferably based on a polygonal model of the specific organ in question, liver, spleen etc. as generated by graphics designers which duplicate the forms of act human organs. Preferably simultaneously or sequentially, but alternatively as a replacement for the previous type of model, each organ is also preferably modeled as a plurality of particles and springs. The two different types of models correlate in that each vertex of the polygon is also more preferably a particle in the particle and spring model, at least at the most detailed level (finest or highest LOD). If a particle is moved, then the vertex is preferably also changed, and the visual display of the organ is preferably changed accordingly.

The behavior of the organs according to the particle model is preferably based on the physics of particles, thus elementary particles as in classical mechanics. Each model is handled as a set of particles, which may for example lie along the surface of the model as an envelope. Such a setup enables the particles to be connected by a system of virtual spring/dampers or acting forces sets, as well as to provide a gravitational force and other environmental forces and constraints.

Since each two neighbor particles are connected through a virtual spring/damper set in the model, the local behavior of the virtual organ in proximity to these particles is such that the particles tend to keep the original organ shape, and to their previous location and configuration when they are pushed or pulled, say by a tool.

In other words, the behavior of the particles which compose the modeled organ supports ae desired behavior of the organ to be modeled, which itself naturally follows such spring/damper behavior, such that modeling the behavior and appearance of the simulated organ according to a plurality of springs, connected at a plurality of connection points, is also suitable and efficient from the perspective of accurate simulation of the organ.

Returning to FIG. 1, and as related above, each model is combined of particles which are virtually connected by a network of Spring/Damper (SD) sets. The SD sets are preferably created along the edges of the model, and thus connect each of the model's vertices. In addition, vertices are selected from the model to create 'model outer skeleton' particles at their location, the core particles referred to above. These core particles remain fixed under the application of force to the organs, for example, by tools. Hence the SD sets that connect between and core particles effectively activate correction forces on the regular body particles. These correction forces prevent the object from changing its shape drastically. Without such correction the model would tend to lose its dimensional shape after morph op ons, or collapse into itself.

Another optional but prefer method used for the present invention is to connect selected opposite particles with SD sets while disconnecting the model from its outer skeleton or core particles. As explained above, such an option is useful when a global organ movement is needed. An example of such a need is in a Cholecystectomy procedure, where the gallbladder organ is to be separated from the liver and removed.

The model behavior according to the above guidelines resembles the behavior of a deformable object in the real world, and the deformation depends on the density and strength coefficients of the SD sets.

Preferably, several Level-Of-Details (LOD) models are kept for each model. These LODs are used mainly for faster scene interactions during hit tests and tool interaction.

The virtual organ 10 of FIG. 1 is shown sliced for descriptive purposes only, with a sketch of the SD sets along the opening and the center particles. Note that each of the skeletal particles may actually represent two different particles, one which belongs to the model's vertices, while the other (which is attached to it) belongs to the outer skeletal model.

According to preferred embodiments of the present invention, there is preferably provided a method for performing scene manipulation at each update. Since any motion in reality is continuous, the forces which are applied to any object are continuous as well. When simulating this motion through mathematical models as operated by software, this type of continuity cannot be achieved, hence discrete time steps are preferably used for each update cycle, and the time step is more preferably at a large enough size to enable the calculations to be done in real time. The system calculates the configuration of the organs (particles and forces) at each update cycle.

The screen display is done in parallel, such that each display operation is preferably performed in parallel with other such operations, rather than perform all display operations sequentially. Each such operation may use different system resources, thereby increasing the efficiency of the overall process. For example, one operation might only require the use of the video graphics card, while another operation might require the CPU. Since a fixed fame (per second) display rate (FPS) is desired, at least once for every (preferably fixed) number of update cycles, the system calculates the graphical representation of the organs according to the locations of the particles, and draws this representation on the screen.

At each time step, all the applied forces and the locations of particles are preferably calculated. The calculation may involve setting all the tools to their correct location and operation at the time step. Then the system applies the tools and motions to the particles and calculates the acting forces The system now preferably computes the accelerations, velocities and new locations of particles in the environment.

Another optional but preferred acting optimization scheme more preferably uses only a partial update at each update cycle. At each update cycle the system only updates the objects which were masked by the system as active over the period in question. An active flag is preferably turned on in respect of an object only when an object has interacted with a tool, and the force used reached a minimal defined level. As long as the effect of the tool activation on the organ generates a sufficiently large force, and even after the tool is no longer touching the organ, this flag is preferably kept on so that the force interactions continue until they naturally die out.

A second optional but preferred optimization phase of the scheme is that for each active object only the group of particles which were affected by the interaction are updated. This effect can occur directly, meaning by direct touch with the tool, or indirectly meaning due to forces activated by connection with other particles in a move. As a given tool interaction ceases, the active particles group, or patch grows smaller as the forces effect fades, and the particles return to their rest configuration.

Returning now to FIG. 2 and the three figures A-C show in succession three LODs of the same model. The physical model which is used in this scheme preferably includes the following principles. First of all each particle has properties of mass, location, velocity and acceleration, as well as other non-physical qualities. Any particle can preferably be attached to any particle in the scene, any location in the 3D space, or a pre-defined geometric constraint.

The following force equation is then preferably used:

$$Fparticle=Fa+Fc$$

where Fa is the overall applied force, while Fc is the overall component of the constraint forces (geometric constraint), which is not always known in advance. The geometric constraint may optionally be used to preserve a fixed distance between particles, for example, if required by the model. If a set of working particles does not contain constraints, the forces are preferably calculated explicitly without the need to solve the equation systems. Such an optional but preferred embodiment enables a set of affected particles to be selected and manipulated separately.

Note that by moving particles due to the action of tools, new forces are indirectly introduced to the calculations, due to the SD (spring/damper) fore sets which connect the particles. The particles which are touched by the tools ae of interest for further calculations, and therefore are preferably handled separately. More preferably, the spring/damper sets are modeled such that moving (changing the location) of the particle(s) being touched causes the remaining affected particles to automatically move, thereby increasing the efficiency and speed of the modeling process. Upon release, the particles which are not directly affected preferably return to their original location. More preferably, even before release, those particles which are not directly affected initially experience large force, but then return to their original position even before the tool stops touching neighboring particles.

The interactions within he model, for example between a tool and an organ, are preferably regulated and/or affected by several elements These elements optionally include but are not limited to, the effect of gravity force over the organs, such that an organ is deformed by its own weight as well as by contact with other orbs; and tool operations, such that an organ can be pulled, pushed, cut or pressed against other organs by tool operation.

Each tool operation and effect is immediate, and the global effect over the contact organ and its neighbors is then performed by a particle system solver as a second stage, hence representing the effect of the tools over the entire environment. After the interaction has been determined on a physical level, the system preferably uses the connectivity between the physical model and the graphical model (which do not necessarily overlap) to update the graphical model and prepare it for a rendering cycle.

The previous discussion described modeling of the organs themselves. However, organs always contain blood vessels, frequently there are delicate blood vessels and bot arteries and veins are preferably modeled as part of simulating the procedure. This is difficult (or even impossible) to achieve according to the prior art physical system, yet the ability to avoid darning especially the major blood vessels is an important part of the surgeon's skill. According to preferred embodiments of the present invention, a blood vessel modeling solution is used, which is based on what may be described as a Multiple Spline Physical Mechanism or MSpline mechanism for short.

The MSpline mechanism is based on a set of splines, which form the shape of the desired blood vessels in the working area. A spice is a three dimensional curve in space. Each spline is constructed of a set of control points through which the curve passes, for example according to the Catmull-Rom curves method for representing splines. The artery or vein graphical representation itself may be constructed by building a mesh with varied radius, profile and texture around each curve.

Optionally and more preferably, each blood vessel representation is constructed of a plurality of splines in the form of a branched tree, as shown in FIG. 3 described hereinabove. The main spline preferably continues the length of the tree, while the remaining, or smaller, splines form the branches of the tree. This sure is preferred as the addition of texture and other structural elements is more easily accomplished by using the branched tee. Furthermore, such a structure preferably enables a plurality of meshes to be attached to the tree, in order to form a pipe for the blood vessels, or more preferably any other structure which can be appropriately modeled according to the description.

Each of the control points is also preferably constructed as a particle in the 3D scene, thereby connecting the control points by SD sets. The particles are also preferably connected to core particles, which are, as described above, particles that do not move under the effect of forces or alternatively or additionally move in accordance with some other geometric constraint such as location on the organ. The effect of this connection keeps the veins fixed to their resting locations unless they are themselves affected by tools. The effect of tools on the veins, for various operations such as grabbing, pushing, moving, and cutting for example, preferably causes a global effect over all the splines which arm connected to the affected vein spline (a Multi-Spline effect).

According to other preferred embodiments of the present invention, each organ or other object of the model to be simulated is preferably represented by a rigid object, while each object is surrounded by an envelope that is a combination of particles. Therefore, the object is preferably represented by orientation and location, and their derivates, which are linear velocity/acceleration and angular velocity/acceleration.

Interactions between the tools and the organs (or any other interactions between the objects in the model) cause the particles to generate forces according to the action of their springs/dampers set.

The forces of all the springs at the points of interaction of the tools can optionally be summed and applied as forces and momenta over the rigid object, such that the physical behavior of the rigid objects is modeled as a basic layer below the physical behavior of the particles.

As the rigid object moves (due to the effect of these forces and momenta) the entire envelope moves and therefore all of the particles move as well. This behavior enables the global effects of tool interactions to be modeled; if only particles are used, only local interactions can be modeled). The particles themselves are still free to move and generate local deformation effects on the tissue through the forces which are generated by their springs/dampers.

In addition to the abovementioned anatomy, the human body organs are connected with connecting tissue or ligaments. This tissue is usually removed from the area of the surgical intervention in order to better visualize the anatomy. Naturally a simulator for surgical interventions would include the simulation of this connecting tissue. The method presently preferred for the simulation of connecting tissue comprises the use of a technique we call "Tissue-Strips"™. A "Tissue-Strip"υ is a linear segment with a diameter function along the length of the strip. The diameter describes the volume around the linear segment at each point. The strip is also defined by two connection points on the surface, or alternatively the interior, of two organs, or any other part of the anatomy. Each strip can interact with tee tools and the surrounding anatomy. When a strip is grabbed or pushed it deforms. After deformation it no longer has a linear shape but is now a curve. The curve describes the current status of the "Tissue-Stripe"™ and the shape thereof. The physical behavior of the strips as described above is in fact derived from the physical properties of a rubber band. To illustrate this concept think of a rubber band which is cut to form a straight line and then connected to two points in space. When untouched, the band rests in a straight line between the two connected points. When the "Tissue Strips"™ are touched by a tool a contact point between the strip and the tool is created. This contact point is fire to slide along the Tissue-Strip's length as well as along the tool until the connection is broken, that is the strip return to the relaxed position. In addition, the forces generated by the stretching of the Tissue-Strip™ can be applied back to the organs they are connected to, and/or other virtual objects they are in contact with, such as tools, and thus create local deformations of the connected organs. In the rubber band example, the deformation corresponds to the forces the band applies back to the connection points when pulled. The properties of the rubber band allow the simulation of the band using relatively low computational costs. For this reason, the simultaneous simulation of multiple "Tissue-Strips"™ is made feasible. So in order to simulate an area of connecting tissue multiple "Tissue-Strips"™ are created in he area and cover the entire volume of the connecting ligament. Also, simulation and coagulation of "Tissue-Strips"™ is possible by simple reducing the diameter of the strip at the coagulation point until a diameter of zero is reached at which point the strip is cut and removed from the collection of strips.

In addition, a visual 3D model can be constructed from the strips to complete the simulation with a visual representation of the strips.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fill within the spirit and broad scope of the appended claims. All publications, patents and patent applications mentioned in this specification are herein incorporated in their entire by reference into the specification, to the same extent as if each individual publication, patent or pate application was specifically and individually indicated to be incorporated herein by reference. In addition, citation or identification of any reference in this application shall not be construed as an admission that such reference is available as prior art to the present invention.

What is claimed is:

1. A computer system comprising a virtual organ for use in simulated medical procedures, the computer system comprising:

a processor to perform a simulated medical procedure using the virtual organ, the virtual organ being a computer-implemented simulation, a user interaction device for user interaction with the virtual organ during the simulated medical procedure; and a user interface for presenting results of the simulated medical procedure, wherein the virtual organ comprises:

a structure of elastic strip elements that simulate connecting tissues to be removed in the medical procedure, each strip element being a linear segment defined by a diameter function along the length of the strip element and two connection points wherein the diameter function defines a volume parameter around the linear segment at each point of the segment and when force is applied to a particular one of the elastic strip elements at a coagulation point by the user interaction, the diameter of the particular strip element at the coagulation point is reduced to zero so as to remove the particular strip element from the structure.

2. The computer system of claim 1, wherein the virtual organ further comprises a network of spline curves in a tree and branch configuration, the spline curves being connected such that a force applied at one of said spline curves provides pull and stretch propagation through said tree and branch configuration, therewith to provide a blood circulation network to said organ, said spline curves have respective lengths and are surrounded circumferentially by tubular meshes, wherein a tubular mesh comprises a plurality of polygons grouped to form a tubular surface.

3. The computer system of claim 2, wherein said tubular meshes comprise radii that vary along said lengths.

4. The computer system of claim 2, wherein said tubular meshes comprise profiles that vary along said lengths.

5. The computer system of claim 2, wherein said tubular meshes comprise textures that vary along said lengths.

6. The computer system of claim 1, wherein the virtual organ further comprises a plurality of elements, each element having neighboring elements and a plurality of tensioned connections connecting neighboring elements over said organ, such that force applied at one of said elements propagates via respective neighboring elements to provide a distributed reaction over said organ and at least one of said elements is a core element whose movement under application of a force is subject to an additional constraint.

7. The computer system of claim 6, wherein said core element is connected to a control point of a spline curve simulating a blood vessel, thereby to cause said additional constraint to propagate to said spline curve.

8. The computer system of claim 6, wherein said core element is part of an outer skin of said organ, and said additional constraint is to retain said core element in a predetermined position, thereby to provide a restorative force to neighboring elements thereof.

9. The computer system of claim 8, further configured to be temporarily disconnected from said at least one core element to allow a global movement of said organ.

10. The computer system of claim 9, further being configured to permit connection of additional tensioned connections to oppositely facing elements thereof during said global movement, wherein oppositely facing elements comprise a pair of elements arranged to permit the exertion of a force upon a first one of said elements in an opposite direction to said second one of said elements.

11. The computer system of claim 1, comprising at least one additional element to provide a gravitational effect on said organ.

12. The computer system of claim 1, associated with a tracking arrangement, wherein said force is applied thereto in accordance with tracking of a physical tool by said tracking arrangement.

13. The computer system of claim 12, wherein said tracking arrangement is an optical tracking arrangement.

14. The computer system of claim 12, wherein said tracking arrangement is an ultrasound tracking arrangement.

15. A system for simulation of a surgical procedure comprising:
   a) at least one virtual organ, the virtual organ being a computer-implemented simulation comprising:
   a structure of elastic strip elements that simulate connecting tissues to be removed in the medical procedure, each strip element being a linear segment defined by a diameter function along the length of the strip element and two connection points wherein the diameter function defines a volume parameter around the linear segment at each point of the segment and when force is applied to a particular one of the elastic strip elements at a coagulation point by a user interaction with the virtual organ, the diameter of the particular strip element at the coagulation point is reduced to zero so as to remove the particular strip element from the structure;
   b) a physical manipulation device for manipulation by a user; and
   c) a tracking arrangement for tracking said physical manipulation device and translating motion of said physical manipulation device into application of forces onto said virtual organ.

16. The system of claim 15, further comprising a feedback unit for providing force feed back to said physical manipulation device.

17. The system of claim 16, wherein said physical manipulation device is a laparoscopy tool.

18. The system of claim 15, wherein said tracking arrangement is an optical tracking arrangement.

19. The system of claim 15, wherein said tracking arrangement is an ultrasound tracking arrangement.

20. The system of claim 15, wherein said virtual organ further comprises a network of spline curves in a tree and branch configuration, the spline curves being connected such that a force applied at one of said spline curves provides pull and stretch propagation through said tree and branch configuration, therewith to provide a blood circulation network to said organ and said spline curves are connected such that a force applied at one of said spline curves propagates through connected spline curves over said tree and branch configurations.

21. The system of claim 20, wherein said spline curves have respective lengths and are surrounded circumferentially by tubular meshes, wherein a tubular mesh comprises a plurality of polygons grouped to form a tubular surface.

22. The system of claim 21, wherein said tubular meshes comprise radii that vary along said lengths.

23. The system of claim 21, wherein said tubular meshes comprise profiles that vary along said lengths.

24. The system of claim 21, wherein said tubular meshes comprise textures that vary along said lengths.

25. A method for simulating an interaction with an organ, the method comprising:
   providing a computer system and a physical interaction device;
   constructing a simulated organ on said computer system using a plurality of particles and spring/damper (SD) sets, ones of said plurality of particles being connected to others of said particles by said SD set to provide a plurality of connected particles to collectively model a mechanical geometric behavior of the organ, wherein the simulated organ comprises a structure of elastic strip elements that simulate connecting tissues, at least a portion of the elastic strip elements are to be removed in a simulated medical procedure, each strip element being a linear segment defined by a diameter function along the length of the strip element and two connection points, wherein the diameter function defines a volume parameter around the linear segment at each point of the segment;
   simulating a physical force on the organ by applying a simulated instrument to a location on said organ using said physical interaction device, said location corresponding to at least one of said particles, said force being allowed to alter at least one physical characteristic of the organ according to application of said force to said at least one of said particles directly, and according to application of said force indirectly via said SD set to others of said particles; and
   simulating a physical force on a particular one of the elastic strip elements by applying a virtual model of the physical interaction device to a coagulation point on the particular strip element, wherein the force causes the diameter of the particular strip element at the coagulation point to be reduced to zero so as to remove the particular strip element to be cut and removed from the structure.

26. The method of claim 25, further comprising:
   adding a tree structure of spline curves, the spline curves being connected such that a force applied at one of said spline curves provides pull and stretch propagation through said tree and branch configuration, to provide to said organ a simulation of a blood circulation network, wherein said adding the tree structure comprises surrounding respective ones of said spline curves with meshworks of variable radii.

27. The method of claim 25, comprising removing the particular strip element by reducing the diameter function at the location on the particular strip element to zero.

28. The method of claim 25, wherein said simulated instrument is a simulated surgical instrument.

29. The method of claim 25, wherein said simulated instrument is a simulated laparoscopy instrument.

30. The method of claim 25, wherein said simulating the physical force is simulating any one of a group comprising: moving said organ, cutting said organ, pressing said organ, suturing said organ, and carrying out a coagulation at said organ.

31. The method of claim 25, comprising linking each of said particles to each neighboring particle via one of said SD sets, such that motion at each particle brings about secondary motion at neighbors thereof.

32. The method of claim 25, comprising constructing said elastic elements to simulate physical properties of elastic bands.

33. The method of claim 25, comprising connecting said elastic elements to two points in the simulated organ.

34. The method of claim 25, comprising:
    simulating deformations as a result of interaction with other virtual objects using sliding contact points, wherein a contact point comprises a location of contact between said simulated instrument and said organ, to simulate a motion of said simulated instrument upon or within said organ.

35. The method of claim 25, further comprising configuring said elastic elements to apply forces back to the points of connection or contact points as a result of stretching or deformation of said elastic elements.

36. The method of claim 25, further comprising:
    constructing a visual display model of the organ according to a plurality of polygons, said polygons being connected at vertices of said polygons;
    determining a correspondence between each particle and each vertex; and
    simulating a visual display of the organ according to said simulation of the organ and according to said correspondence.

37. A method for simulating a surgical procedure on a body component using a computer system and a physical interaction device, the method comprising:
    on said computer system constructing at least the body component as a plurality of particles and spring/damper (SD) sets, wherein at least one of said plurality of particles is connected by at least one SD set to at least one other particle, such that movement at one of said connected particles leads to an effect on another particle connected thereto, wherein the body component comprises a structure of elastic strip elements that simulate connecting tissues, at least a portion of the elastic strip elements are to be removed in a simulated medical procedure, each strip element being a linear segment defined by a diameter function along the length of the strip element and two connection points, wherein the diameter function defines a volume parameter around the linear segment at each point of the segment;
    simulating a physical interaction with a physical force on at least one of said particles based on user input via said physical interaction device, such that said physical interaction propagates over the body component via respectively connected SD sets following application of said force to said at least one particle; wherein said physical interaction is part of said surgical procedure; and
    simulating a physical force on a particular one of the elastic strip elements by applying a virtual model of the physical interaction device to a coagulation point on the particular strip element, wherein the force causes the diameter of the particular strip element at the coagulation point to be reduced to zero so as to remove the particular strip element from the structure.

38. The method of claim 37, further comprising:
    altering a visual display of at least the body component at least partially according to said physical interaction.

39. The method of claim 38, wherein said alteration of said visual display is performed by:
    constructing a visual display model of at least the body component according to a plurality of polygons, said polygons being connected at vertices of said polygons;
    determining a correspondence between each particle and each vertex; and
    simulating a visual display of at least the body component according to said simulation of at least the body component and according to said correspondence.

40. The method of claim 37, comprising performing said physical interaction according to a behavior of a simulated tool.

41. The method of claim 40, comprising using tracking of a physical manipulation device to define said behavior of said simulated tool.

* * * * *